(12) United States Patent
Wagner et al.

(10) Patent No.: US 7,410,530 B2
(45) Date of Patent: Aug. 12, 2008

(54) APPARATUS FOR CLEANING EXHAUST AFTERTREATMENT DEVICES AND METHODS

(75) Inventors: Wayne M. Wagner, Apple Valley, MN (US); Mary Joanne Lorenzen, Chanhassen, MN (US); John T. Herman, Rhinelander, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 318 days.

(21) Appl. No.: 11/335,163

(22) Filed: Jan. 18, 2006

(65) Prior Publication Data

US 2006/0201326 A1    Sep. 14, 2006

Related U.S. Application Data

(60) Provisional application No. 60/658,538, filed on Mar. 4, 2005.

(51) Int. Cl.
*B01D 46/00* (2006.01)
(52) U.S. Cl. ............................. 95/280; 95/278; 95/279; 55/302; 55/301; 55/293
(58) Field of Classification Search .................. 55/293, 55/301, 302; 95/278–280
See application file for complete search history.

(56) References Cited

U.S. PATENT DOCUMENTS

| 3,421,295 A | 1/1969 | Swift et al. |
| 4,157,899 A | 6/1979 | Wheaton |
| 4,159,197 A | 6/1979 | Schuler et al. |
| 4,171,963 A | 10/1979 | Schuler |
| 4,174,204 A | 11/1979 | Chase |
| 4,359,864 A | 11/1982 | Bailey |
| 4,395,269 A | 7/1983 | Schuler |
| 4,452,616 A | 6/1984 | Gillingham et al. |

(Continued)

FOREIGN PATENT DOCUMENTS

EP        1 060 780 A1    12/2000

(Continued)

OTHER PUBLICATIONS

"CombiClean™ Diesel Particulate Filter Cleaning Station," *Lubrizol Engine Control Systems*, 3 pages (Mar. 2003).

(Continued)

*Primary Examiner*—Duane Smith
*Assistant Examiner*—Sonji Turner
(74) *Attorney, Agent, or Firm*—Merchant & Gould, P.C.

(57) ABSTRACT

The present disclosure relates to a pulse cleaner for cleaning a diesel exhaust treatment device. The pulse cleaner includes a cabinet, a diesel exhaust treatment device mount positioned within the cabinet for mounting the diesel exhaust treatment device during pulse cleaning, and a collection filter positioned within the cabinet for collecting material displaced from the diesel exhaust treatment device during cleaning. The pulse cleaner also includes a pulse generator for generating pulses that are each directed at a majority of a face of the diesel exhaust treatment device when the diesel exhaust treatment device is mounted at the diesel exhaust treatment device mount. The pulse generator includes a pressure tank for accumulating pressurized air, and a valve arrangement that flushes the pressurized air from the tank. A pulse of air for cleaning the diesel exhaust treatment device is generated each time the tank is flushed.

36 Claims, 19 Drawing Sheets

U.S. PATENT DOCUMENTS

| | | | |
|---|---|---|---|
| 4,504,293 A | 3/1985 | Gillingham et al. | |
| 4,509,960 A | 4/1985 | Engel | |
| 4,549,715 A | 10/1985 | Engel | |
| 4,851,015 A | 7/1989 | Wagner et al. | |
| 4,867,768 A | 9/1989 | Wagner et al. | |
| 4,878,928 A | 11/1989 | Wagner et al. | |
| 4,899,540 A | 2/1990 | Wagner et al. | |
| 5,013,340 A | 5/1991 | Taslim et al. | |
| 5,053,603 A | 10/1991 | Wagner et al. | |
| 5,065,574 A | 11/1991 | Bailey | |
| 5,101,095 A | 3/1992 | Wagner et al. | |
| 5,253,476 A | 10/1993 | Levendis et al. | |
| 5,347,809 A | 9/1994 | Moeckel et al. | |
| 5,388,400 A | 2/1995 | Hoppenstedt et al. | |
| 5,390,492 A * | 2/1995 | Levendis | 60/278 |
| 5,397,550 A | 3/1995 | Marino, Jr. | |
| 5,426,936 A | 6/1995 | Levendis et al. | |
| 5,458,673 A | 10/1995 | Kojima et al. | |
| 5,520,366 A | 5/1996 | Elliott | |
| 5,551,971 A | 9/1996 | Chadderton et al. | |
| 5,566,545 A | 10/1996 | Hijikata et al. | |
| 5,595,581 A | 1/1997 | Ichikawa et al. | |
| 5,611,831 A * | 3/1997 | Matsuoka et al. | 55/486 |
| 5,616,171 A | 4/1997 | Barris et al. | |
| 5,634,952 A | 6/1997 | Kasai et al. | |
| 5,683,479 A | 11/1997 | Gillingham et al. | |
| 5,762,783 A | 6/1998 | Harvey | |
| 5,809,777 A * | 9/1998 | Kawamura | 60/303 |
| 5,928,395 A | 7/1999 | Glen et al. | |
| 6,149,716 A | 11/2000 | Bach et al. | |
| 6,471,918 B1 | 10/2002 | Sherwood | |
| 6,526,753 B1 | 3/2003 | Bailey | |
| 6,565,630 B2 | 5/2003 | Ohno et al. | |
| 6,641,646 B2 | 11/2003 | Rosenberg | |
| 6,770,116 B2 | 8/2004 | Kojima | |
| 6,815,038 B2 * | 11/2004 | Morimoto et al. | 428/116 |
| 6,862,881 B1 | 3/2005 | Klingbeil et al. | |
| 6,981,370 B2 | 1/2006 | Opris et al. | |
| 7,015,158 B2 | 3/2006 | Pearce et al. | |
| 7,025,811 B2 | 4/2006 | Streichsbier et al. | |
| 7,055,314 B2 * | 6/2006 | Treiber | 60/297 |
| 7,108,739 B2 | 9/2006 | Iyer et al. | |
| 7,168,243 B2 | 1/2007 | Endicott et al. | |
| 7,357,829 B2 | 4/2008 | Ehlers | |
| 2004/0035094 A1 * | 2/2004 | Jersey | 55/478 |
| 2004/0103788 A1 | 6/2004 | Streichsbier et al. | |
| 2004/0223892 A1 | 11/2004 | Kojima | |
| 2004/0226287 A1 | 11/2004 | Edgar et al. | |
| 2005/0284139 A1 | 12/2005 | Verkiel et al. | |
| 2006/0070359 A1 | 4/2006 | Sellers et al. | |
| 2006/0070360 A1 | 4/2006 | Sellers et al. | |
| 2006/0070361 A1 | 4/2006 | Sellers et al. | |
| 2006/0137329 A1 | 6/2006 | Lowe et al. | |
| 2006/0144223 A1 | 7/2006 | Sellers et al. | |
| 2006/0156919 A1 | 7/2006 | Sellers et al. | |
| 2006/0168952 A1 | 8/2006 | Opris | |
| 2006/0191246 A1 | 8/2006 | Sellers et al. | |
| 2006/0191412 A1 | 8/2006 | Sellers et al. | |
| 2006/0243258 A1 | 11/2006 | Withrow et al. | |
| 2006/0248864 A1 | 11/2006 | Streichsbier et al. | |
| 2007/0000242 A1 | 1/2007 | Harmon et al. | |
| 2007/0119146 A1 | 5/2007 | Callas et al. | |
| 2007/0137150 A1 | 6/2007 | Goddard | |
| 2007/0157809 A1 | 7/2007 | Ehlers | |

FOREIGN PATENT DOCUMENTS

| | | |
|---|---|---|
| EP | 1 252 919 A1 | 10/2002 |
| EP | 1 369 161 A1 | 12/2003 |
| FR | 2 815 884 A1 | 5/2002 |
| JP | 2004239072 | 8/2004 |
| WO | WO 93/03262 | 2/1993 |
| WO | WO 95/23280 | 8/1995 |

OTHER PUBLICATIONS

"Dalamatic® Dust Collectors," *Donaldson Company, Inc.*, 12 pages (2002).

"Diesel Particulate Filter Maintenance: Current Practices and Experience," *Manufacturers of Emission Controls Association*, pp. 1-19 (Dec. 2004).

International Application No. PCT/US2006/001850, filed Jan. 18, 2006 entitled "Apparatus for Combusting Collected Diesel Exhaust Material from Aftertreatment Devices and Methods," 28 pages.

"Mobile Cleaning Unit for Diesel Particulate Filters," *Product and Service Bulletin from Dinex Exhausts Ltd.*, 6 pages (Nov. 2001).

"RF Baghouse Dust Collectors," *Donaldson Company, Inc.*, 12 pages (2005).

"RF Dust Collectors. Models 48RF8-484RF12," *Donaldson Company, Inc.*, 4 pages (1994).

"Off-Line Regeneration of Overloaded Ceramic Cores," Written by Bruce Hoppenstedt, *Donaldson Company, Inc.*, 14 Pages (May 23, 1991).

Cleaire Product Catalog: Horizon™, http://www.cleaire.com/site/products/horizon.html, 7 pages (May 10, 2006).

\* cited by examiner

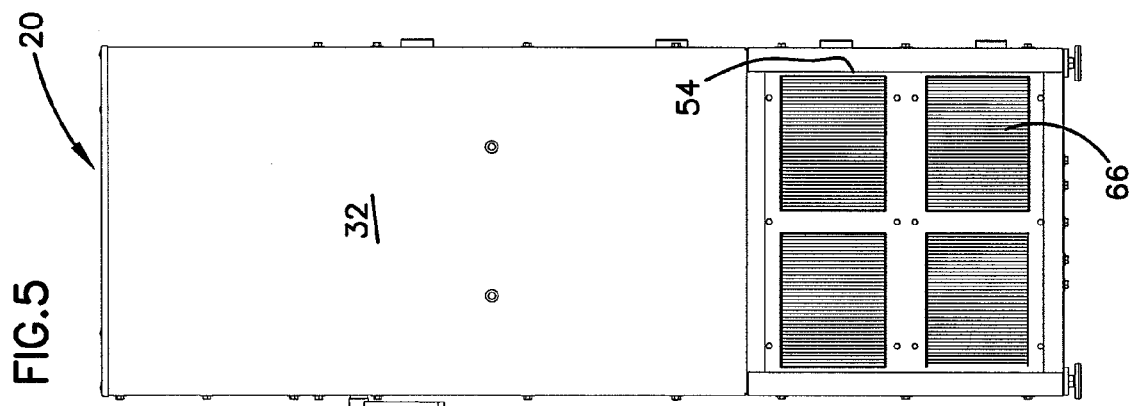
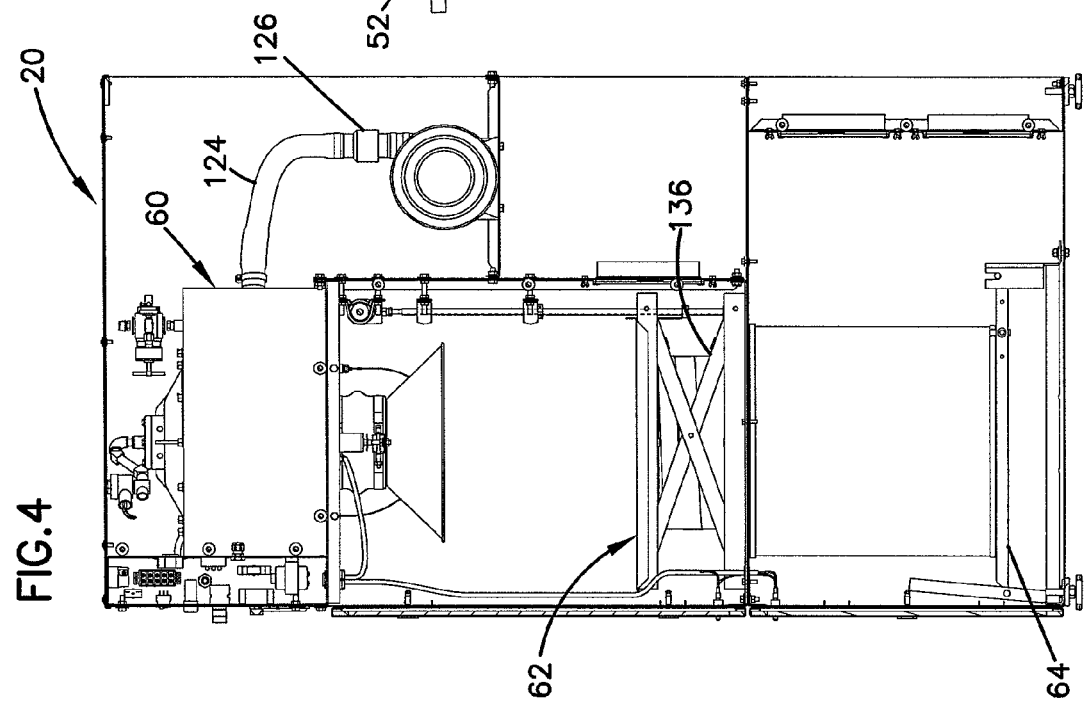
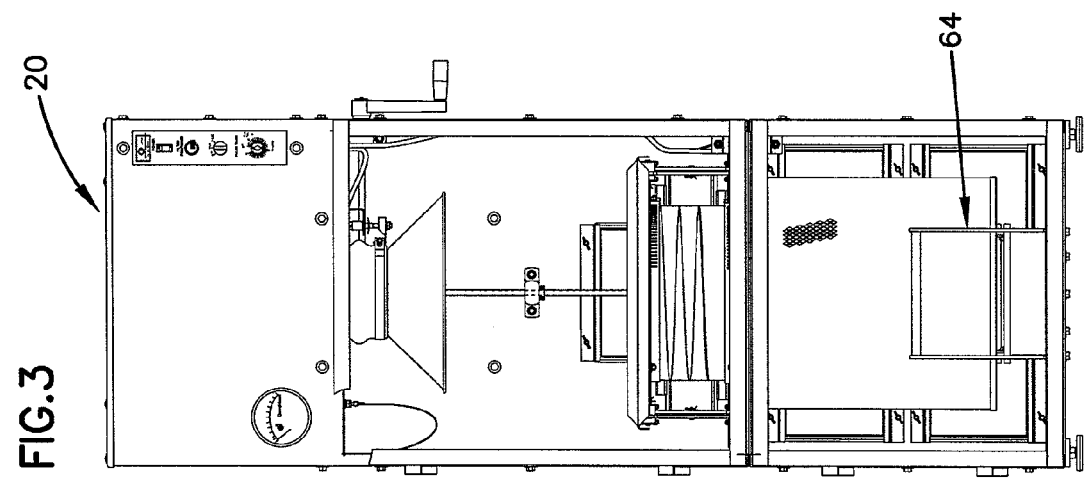

APPARATUS FOR CLEANING EXHAUST AFTERTREATMENT DEVICES AND METHODS

CROSS REFERENCE TO RELATED APPLICATION

This application claims the benefit of U.S. Provisional Patent Application Ser. No. 60/658,538, filed Mar. 4, 2005, which application is hereby incorporated by reference in its entirety.

TECHNICAL FIELD

The present invention relates generally to devices and methods for servicing/cleaning diesel particulate filters or other exhaust after treatment devices.

BACKGROUND

To reduce air pollution, engine exhaust emissions standards have become increasingly more stringent. After treatment devices have been developed to satisfy these increasingly stringent standards. For example, catalytic converters have been used to reduce the concentration of pollutant gases (e.g., hydrocarbons, carbon monoxide, nitric oxide, etc.) exhausted by engines. With respect to diesel engines, diesel particulate filters have been used to reduce the concentration of particulate matter (e.g., soot) in the exhaust stream. U.S. Pat. No. 4,851,015, which is hereby incorporated by reference, discloses an example diesel particulate filter. Other example types of after treatment devices include lean NOx catalyst devices, selective catalytic reduction (SCR) catalyst devices, lean NOx traps, or other device for removing pollutants from engine exhaust streams.

At times, it is required to service after treatment devices. To facilitate servicing, after treatment devices are often clamped into an exhaust system as modules or separate units. For example, clamps can be provided at flange interfaces located opposite adjacent opposite ends of the after treatment devices. By removing the end clamps, a given after treatment device can be removed from its corresponding exhaust system for servicing.

In use, after treatment devices occasionally become overloaded with soot, ash or other materials present in or generated from engine exhaust. As after treatment devices become overloaded, the devices cause undesirable backpressure in their corresponding exhaust systems. Before an after treatment device becomes plugged to the point where excessive backpressure is a concern, it is recommended to remove the device from its corresponding exhaust system for servicing. To service a device such as a diesel particulate filter, it is known to manually move a focused stream of pressurized air back and forth across the outlet side of the filter to loosen soot/ash that has collected on the filter. For example, a dry air gun (e.g., 50-100 psi) can be used as a source of pressurized air. Simultaneously, an industrial vacuum device is coupled to the inlet side of the filter. The vacuum device is typically equipped with a high-efficiency particulate air filter or ultra-low penetration air filter for collecting the soot/ash that is blown from the filter by the pressurized air. Total time for cleaning the filter depends on the size of the filter, but is typically 30-50 minutes.

Pulse cleaners have been used in other filtration applications to clean filters. For example, industrial dust collection systems have been designed with "self-cleaning" filters for removing dust from an air stream (e.g., see U.S. Pat. No. 4,159,197). These systems have filters (e.g., pleated filters or bag filters) that are cleaned inset (i.e., on-line). For example, while the systems are in use collecting dust, the systems periodically use nozzles to direct pulses of air at the filters in a reverse-flow direction (i.e., in a direction opposite to the flow of air being filtered) to drive or shake collected dust from the filters.

What is needed is an improved device/method for servicing overloaded diesel particulate filters or other exhaust after treatment devices.

SUMMARY

Certain aspects of the present disclosure relate to devices and methods for efficiently and effectively cleaning diesel particulate filters or other after treatment devices.

Examples representative of a variety of inventive aspects are set forth in the description that follows. The inventive aspects relate to individual features as well as combinations of features. It is to be understood that both the forgoing general description and the following detailed description merely provide examples of how the inventive aspects may be put into practice, and are not intended to limit the broad spirit and scope of the inventive aspects.

BRIEF DESCRIPTION OF THE DRAWINGS

FIG. 3 is a front view of the cleaner of FIG. 1 with the two front doors removed;

FIG. 4 is a right side view of the cleaner of FIG. 1 with the side wall removed;

FIG. 5 is a rear view of the cleaner of FIG. 1;

DETAILED DESCRIPTION

Figure 1:
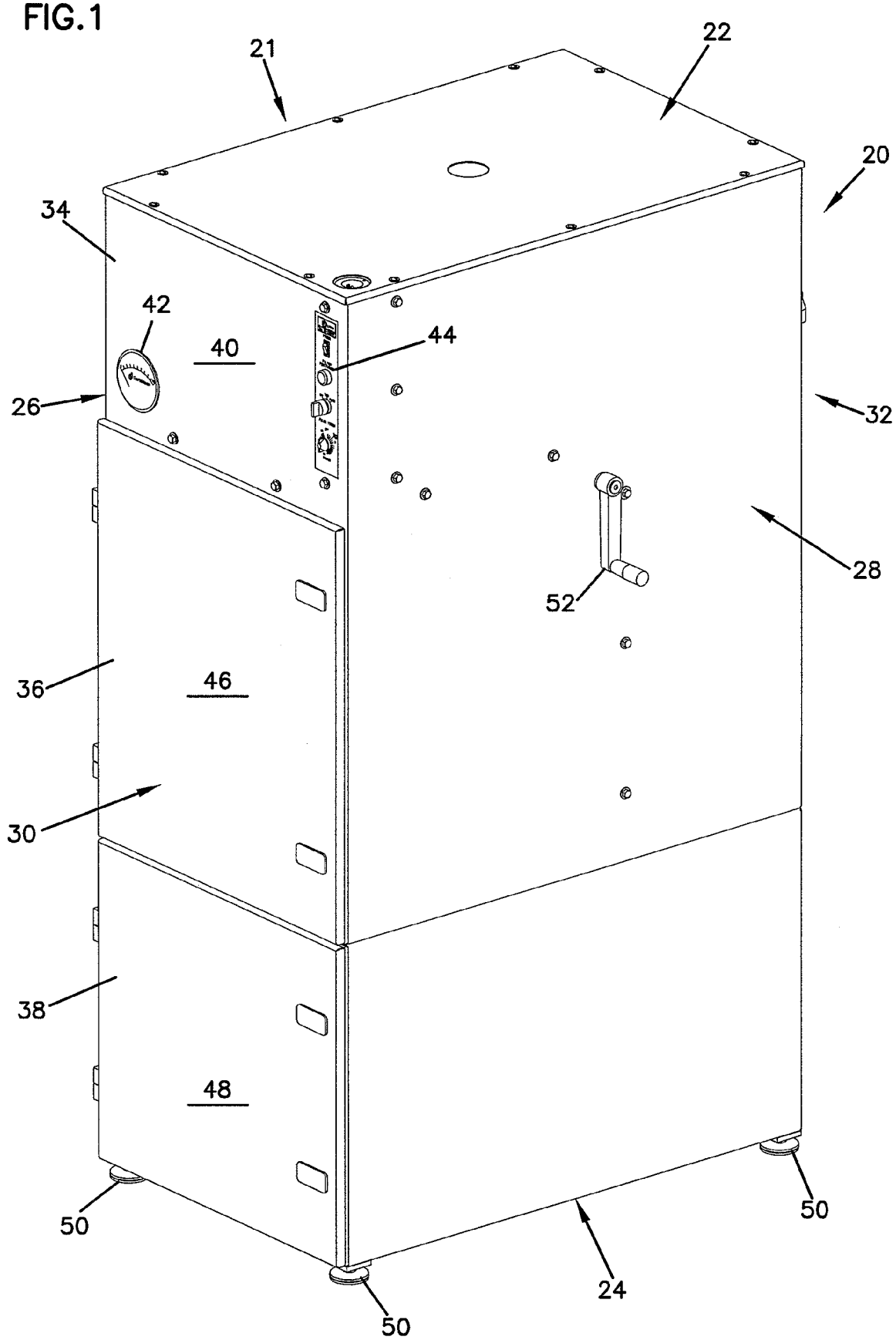
FIG. 1 is a perspective view of an after treatment device cleaner having features that are examples of inventive aspects in accordance with the principles of the present disclosure.

In the following detailed description, references are made to the accompanying drawings that depict various embodiments which are examples of how certain inventive aspects may be practiced. It is to be understood that other embodiments may be utilized, and structural and functional changes may be made without departing from the broad scope of the inventive aspects.

The present disclosure relates to methods and systems for efficiently and effectively cleaning diesel particulate filters (DPF) or other exhaust after treatment devices. In one embodiment, relatively high volume pulses of relatively low-pressure compressed air are used to back flush collected material (e.g., soot, ash or other material captured from engine exhaust) from after treatment devices. In certain embodiments, each pulse is directed at majority of the cross-sectional area of the outlet face of a given after treatment being cleaned. In preferred embodiments, each pulse is directed at substantially the entire cross-section area of the outlet face of the after treatment device being cleaned. This ensures that pressurized air is directed at all of the channels of the after treatment device and eliminates the need to manually move a focused pressurized air stream back and forth across the outlet face.

Throughout the remainder of the specification, cleaning devices and methods are described primarily with respect to cleaning diesel particulate filters. However, it will be appreciated that the same devices and methods can be used to clean other types of engine exhaust after treatment devices as well. Other example after treatment devices that may require servicing include catalytic converters, lean NOx catalyst devices, selective catalytic reduction (SCR) catalyst devices, lean NOx traps, or other devices for removing for removing pollutants from the exhaust stream. The methods and cleaners can also be used to clean other types of filters/treatment devices, and are not limited exclusively to engine exhaust after treatment devices.

Diesel particulate filter substrates can have a variety of known configurations. An exemplary configuration includes a monolith ceramic substrate having a "honey-comb" configuration of plugged passages as described in U.S. Pat. No. 4,851,015 that is hereby incorporated by reference in its entirety. This type of filter can be referred to as a wall-flow trap or filter. Common materials used for wall-flow filters include silicon carbide and cordierite. Wire mesh, corrugated metal foil and other flow-through type filter configurations can also be used. In certain embodiments, the filter substrate can include a catalyst. Exemplary catalysts include precious metals such as platinum, palladium and rhodium, and other types of components such as base metals or zealots.

As described herein, after treatment devices are described as having inlet sides or faces and outlet sides or faces. The inlet side or face of an after treatment device is the side that faces the incoming flow of exhaust when installed in an exhaust system. The inlet side can be referred to as the "dirty" side since it is the side at which material filtered from the exhaust stream collects. The outlet side or face of an after treatment device is the side that faces away from the incoming flow of exhaust when installed in an exhaust system. The outlet side can be referred to as the "clean" side.

FIG. 1 illustrates a cleaner 20 having features that are examples of inventive aspects in accordance with the principles of the present disclosure. The cleaner 20 includes a cabinet 21 having a top side 22, a bottom side 24, a left side 26, a right side 28, a front side 30 and a back side 32. The cabinet 21 includes an upper region 34, an intermediate region 36 and a lower region 38. The front side 30 of the cabinet 21 includes a front wall 40 positioned at the upper region 34. A pressure gage 42 and a control panel 44 are mounted to the front wall 40. The front side of the cabinet 21 also includes a first door 46 for providing access to the interior of the intermediate region 36 of the cabinet 21, and a second door 48 for providing access to the interior of the lower region 38 of the cabinet 21. An electrical connection opening 45 and an air inlet opening 47 are provided at the top side 22 of the cabinet 21. Adjustable feet 50 are provided at the bottom side 24 of the cabinet 21 for leveling the cabinet 21. A crank handle 52 is provided at the side 28 of the cabinet 21. An air outlet 54 (see FIGS. 2 and 5) is provided at the back side 32 of the cabinet 21.

Referring to FIGS. 2-6, an air pressure tank 60 is provided at the upper region 34 of the cabinet 21, a DPF mount 62 is provided at the intermediate region 36 of the cabinet 21 and a primary filter mount 64 is located at the lower region 38 of the cabinet 21. The air pressure tank 60 and its corresponding flow control arrangement function as a pulse generator that generates pulses of air for cleaning a DPF 70 positioned at the DPF mount 62. A primary filter 72 positioned at the primary filter mount 64 functions to capture material flushed from the DPF 70. A safety filter 66 is provided for re-filtering the air that passes through the primary filter 72 before the air exits the cabinet 21 through the air outlet 54.

In use of the system, the DPF 70 is loaded at the DPF mount 62 and the primary filter 72 is positioned at the primary filter mount 64. With the filters 70, 72 mounted within the cabinet 21, the cabinet doors 46, 48 are closed and the air pressure tank 60 is pressurized with air. When the air pressure tank 60 is filled to a predetermined air pressure, the air pressure tank 60 is opened causing a pulse of air to flush or dump downwardly from the pressure tank 60 through the DPF 70. As the pulse of air moves downwardly through the DPF 70, material (e.g., soot, ash, oil, soluble organic fraction or other material) accumulated on the DPF 70 during use is dislodged/flushed from the DPF 70 and re-captured at the primary filter 72. After passing through the primary filter 72, the air can exit the cabinet 21 through the air outlet 54 and its corresponding safety filter 66. A blower 74 is provided within the cabinet 21 for providing continuous positive pressure to the top side of the DPF 70 between air pulses. The movement of air from the blower 74 assists in causing material loosened by the air pulses to migrate downwardly to the primary filter 72. In other embodiments, a vacuum may be placed downstream of the DPF and the primary filter 72 for continuously drawing air through the DPF 70 and the primary filter 72.

It is typically preferred to mount the DPF 70 in the DPF mount 62 with the outlet side of the filter facing upwardly toward the pressure tank 60. In this configuration, the pulses of compressed air back-flush collected material from the DPF. However, in other embodiments, a filter may be cleaned by alternating between a first orientation where the outlet side faces upwardly toward the pressure tank 60 and a second orientation where the outlet side faces downwardly away from the pressure tank 60. By selectively reversing the orientation of a given filter during cleaning, material accumulated on the filter will alternately be exposed to pulses from opposite directions thereby assisting in dislodging accumulated material from the filter.

Typical DPF's are 10.5 or 11.25 inches in diameter and 14 inches in length. Another common DPF size is 12 inches in diameter and 15 inches in length. To accommodate these sizes of filter, in one non-limiting embodiment, the air pressure tank can have a volume of about 22 gallons, and the air pressure tank is pressurized to about 8-10 pounds per square inch (psi) before dumping its volume of air to generate an air pulse. In other embodiments, the air pressure tank can have a volume in the range 5-50 gallons, or a volume of at least 5 gallons. In one non-limiting embodiment, the air tank is pressurized to a pressure less than 15 psi in the range of 3-15 psi. In certain embodiments, it is desirable for the air flow through the DPF during an air pulse to have an approach velocity of in the range of 20-100 feet per second, or in the range of 50-70 feet per second. Approach velocity is defined as the average speed of the air during a pulse measured at a position immediately upstream of the DPF being cleaned. Example pulse durations are in the range of $\frac{1}{50}$ of a second to 1 second or in the range of $\frac{1}{30}$ of a second to 0.5 second. A preferred pulse duration is about $\frac{1}{20}$ of a second. It will be appreciated that the above numerical information is provided for illustration purposes only, and is not intended to limit the broad inventive aspects of the present disclosure.

In one embodiment, the entire pulse cleaning process can be completed in 15 minutes or less. However, certain filters may take longer than 15 minutes to clean. Therefore, the broad aspects of the invention need not be limited to a particular time frame.

It has been determined that the initial pulse is the most effective at flushing material from an after treatment device. Thereafter, the pulses progressively flush less and less material from the device being cleaned as the device become cleaner. In view of the particular effectiveness of the initial pulses, certain after treatment devices may be cleaned by using only a few pulses or even a single pulse. In practicing one method, 1-100 pulses may be used. In practicing another method, 20-70 pulses may be used. In practicing a further method, 40-60 pulses may be used. Other numbers of pulses than those specified can also be used without departing from the broad concept of the present disclosure.

At times, merely pulsing air through a given filter or other after treatment device may not provide adequate cleaning. For these types of circumstances, the pulse cleaning process can be used in combination with a heating process. For example, an after treatment device can be initially pulse cleaned as described above. If the pulse cleaning does not result in the adequate removal of material from the after treatment device, the after treatment can be heated to combust soot or other combustible materials from the filter. An example system for combusting soot or other materials from an after treatment device is disclosed in PCT Patent Application No. not yet assigned, having attorney docket number 758.1917WOU1, entitled Apparatus for Combusting Collected Diesel Exhaust Material from After treatment Devices and Methods, filed on a date concurrent herewith, which is hereby incorporated by reference in its entirety. After combusting the combustible material from the after treatment device, the after treatment device can again be pulse cleaned to flush ash or other remaining material from the device.

Figure 8:
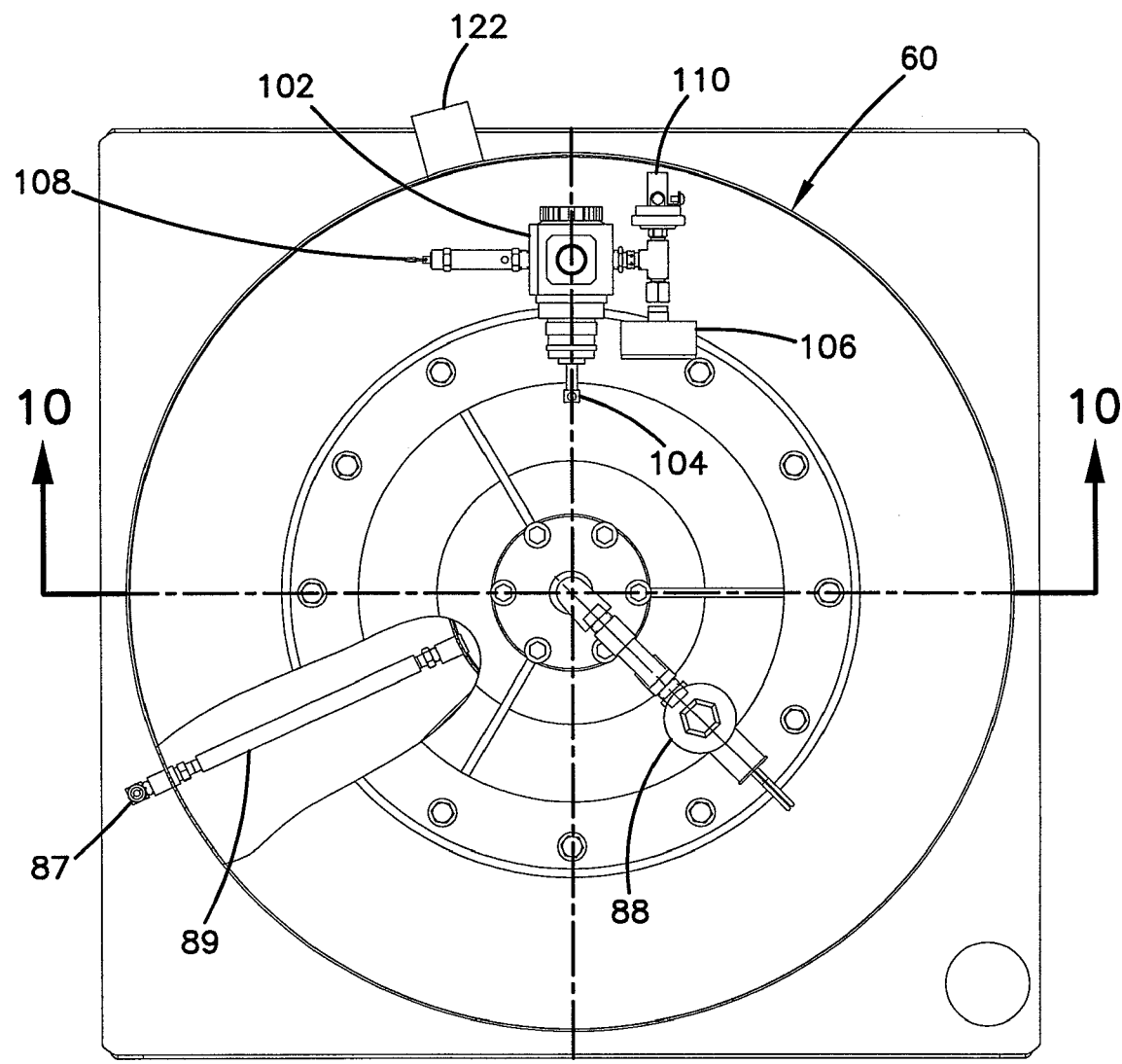
FIG. 8 is a top view of the pressure tank of FIG. 7.
Figure 9:
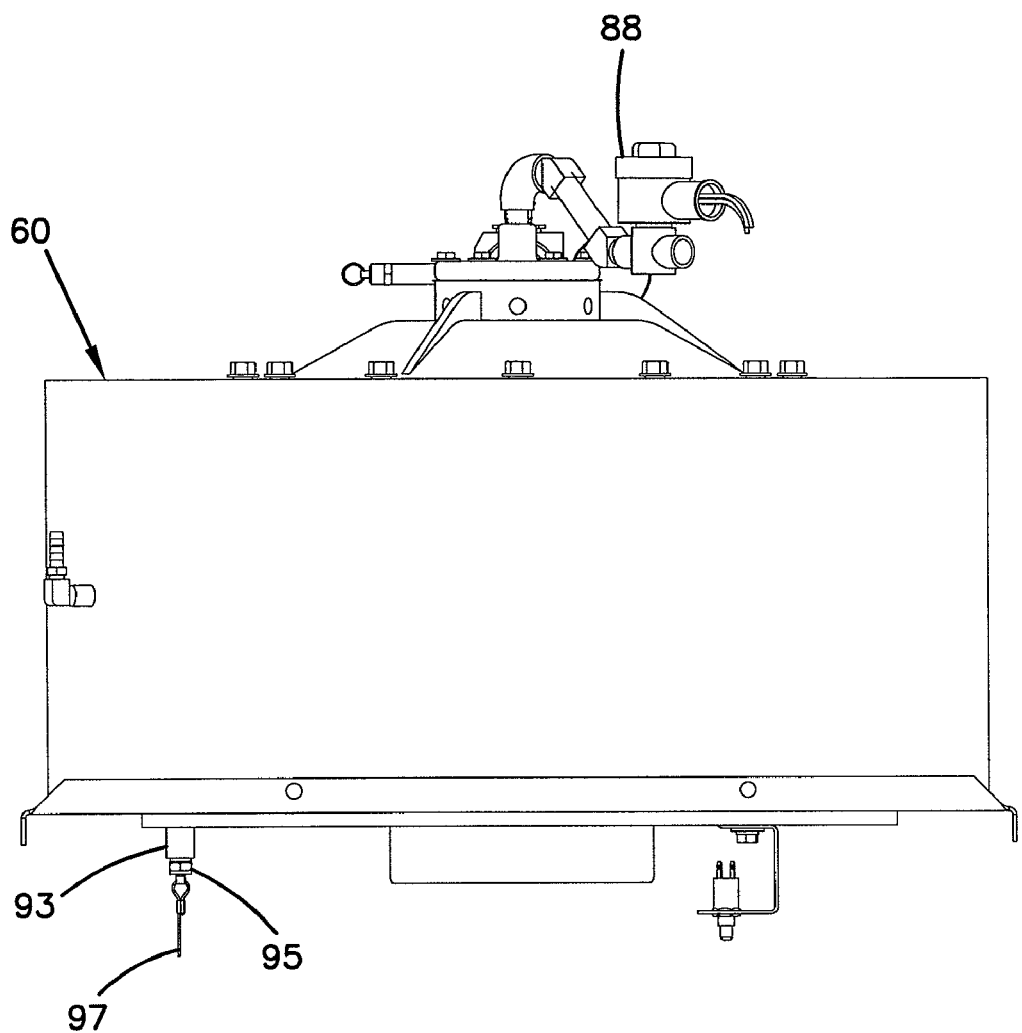
FIG. 9 is a front view of the pressure tank of FIG. 8.
Figure 10:
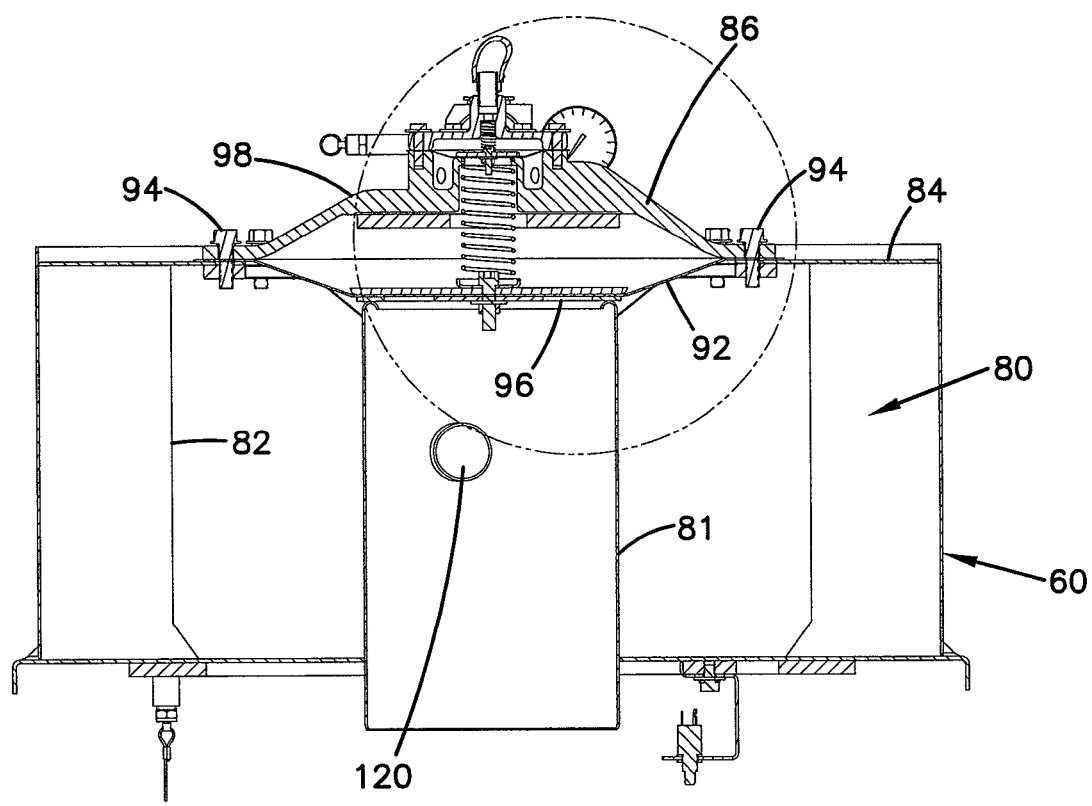
FIG. 10 is a cross-sectional view taken along section line 10-10 of FIG. 8.
Figure 10A:
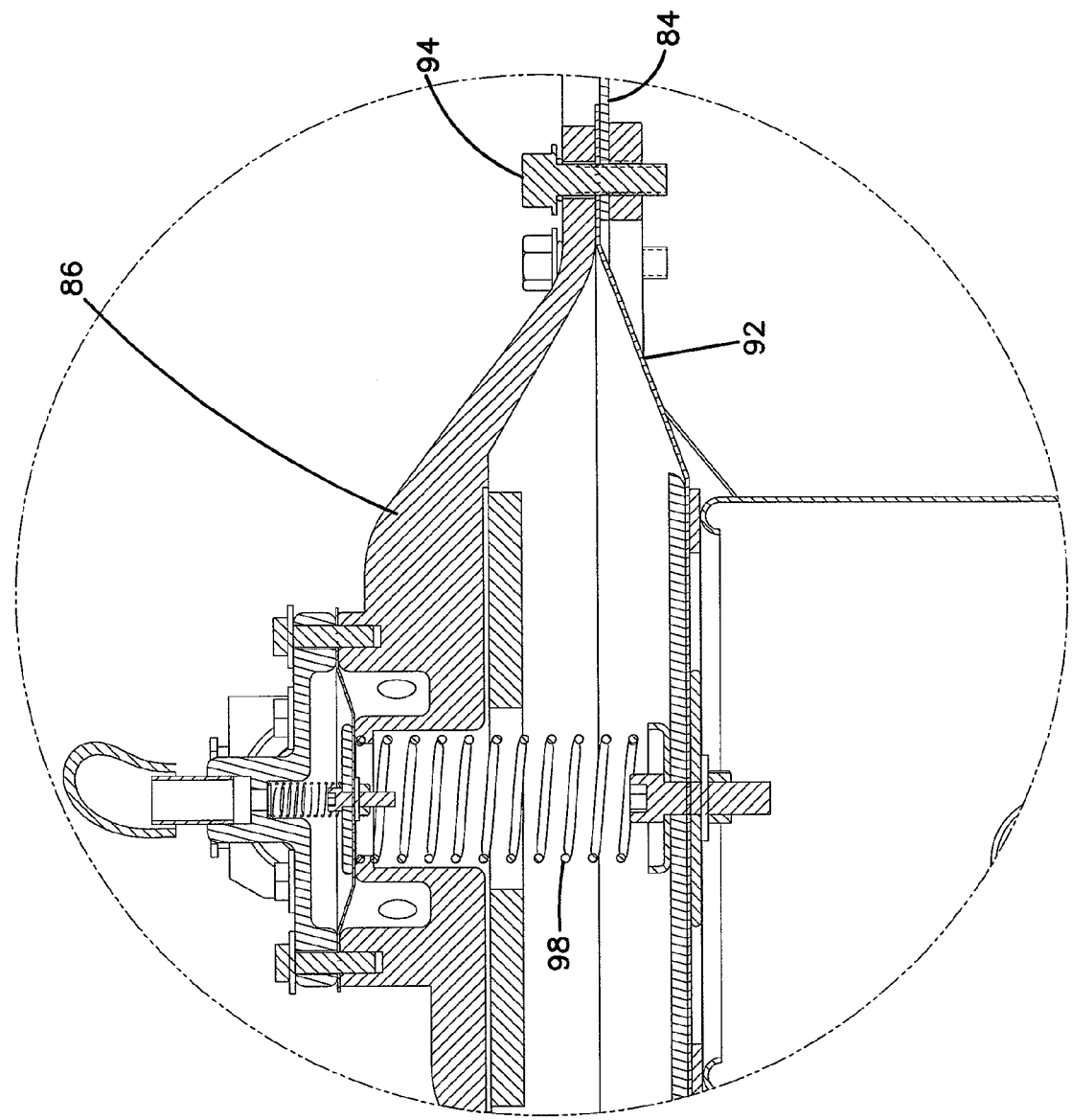
FIG. 10A is an enlarged detailed view of a portion of FIG. 10.

FIGS. 7-10 illustrate the air pressure tank 60 of the cleaner 20. As shown at FIG. 8, the pressure tank 60 defines a generally annular pressure chamber 80 that surrounds a central outlet tube 81. A reinforcing wall 82 divides the chamber 80 into inner and outer annular sub-chambers that are in fluid communication with one another. The top of the chamber 80 is enclosed by main wall 84 and a central cover 86 secured to the main wall 84 by fasteners 94. A diaphragm 92 is mounted beneath the cover 86. A peripheral region of the diaphragm 92 is clamped between the cover 86 and the main wall 84 to seal the outer circumference of the diaphragm 92. A reinforcing plate 96 is mounted to a central region of the diaphragm 92. As shown at FIGS. 10 and 10A, the diaphragm seats on a top end of the outlet tube 81 to block fluid communication between the chamber 80 and the interior of the outlet tube 81. A spring 98 connects the reinforcing plate 96 to a solenoid valve 88 mounted to the central cover 86. When the solenoid valve 88 is actuated, the diaphragm 92 is displaced upwardly from the top end of the outlet tube 81 thereby opening fluid communication between the pressure chamber 80 and the interior of the tube 81. This allows the air within the chamber 80 to flush down the tube 81 as an air pulse.

An air input line 100 (see FIG. 7) is used to fill the chamber 80. One end of the air input line 100 is coupled to a source of compressed air. The other end of the air input line 100 is coupled to a pressure regulator 102 mounted to the main wall 84 at the top of the pressure chamber 80. The pressure regulator 102 supplies compressed air to the chamber 80 through line 103, and regulates the pressure within the chamber 80. A flow control orifice can be provided along the input line for limiting the rate at which air enters the chamber 80. A handle 104 or knob is used to set the desired pressure of the pressure regulator 102. A pressure gage 106 for measuring the pressure within the chamber 80 is coupled to the pressure regulator 102. A pressure relief valve 108 is also coupled to the regulator. In the event the pressure regulator fails, the pressure relief valve 108 prevents excessive pressure from accumulating within the chamber 80. A pressure switch 110 (see FIG. 8) is further coupled to the pressure regulator 102. When the pressure chamber is pressurized to a predetermined air pressure, the pressure switch 100 closes. Upon closure of the switch 100, the solenoid valve 88 is actuated causing the diaphragm 92 to open fluid communication between the chamber 80 and the interior of the outlet tube 81.

As indicated above, the diaphragm 92 functions to open and close fluid communication between the chamber 80 and the interior of the outlet tube 81. When the chamber 80 is being pressurized, the diaphragm 92 seats on an upper end 100 of the outlet tube 81 to close fluid communication between the chamber 80 and the interior of the tube 81. The solenoid 88 and the spring 98 hold the diaphragm against the upper end 100 of the tube 81. During pressurization of the chamber 80, bleed holes in the diaphragm 92 allow air from the main chamber to bleed into the region between the cover 86 and the diaphragm 92. This provides a pressure balance that prevents pressure within the main chamber from prematurely lifting the diaphragm from the top end of the outlet tube as the chamber 80 is pressurized. The chamber 80 is placed in fluid communication with the interior of the outlet tune 81 by actuating the solenoid valve 88. When the solenoid valve 88 is actuated, the spring pressure holding the diaphragm 92 against the tube 81 is released causing the diaphragm 92 to lift upwardly to open fluid communication between the pressure chamber 80 and the interior of the tube 81.

In certain embodiments, the tank 60 can be equipped with a tank drain 93 (see FIG. 9) for allowing any moisture condensate that may collect in the chamber 80 to be blown from the chamber 80. The tank drain 93 is defined through a bottom wall of the tank 60. A plug 95 is spring biased to a closed position to normally close the drain 93. The drain 93 is opened pulling downwardly on cord 97 attached to the plug 95.

Referring to FIG. 10, the outlet tube 81 defines a hole 120 for connecting the blower 74 to the interior of the outlet tube 81. A pipe 122 (shown at FIG. 6) extends from the hole 120 to the exterior of the chamber 80. A hose 124 connects the blower 74 to the pipe 122. A one-way check valve 126 (see FIG. 7) prevents air from traveling through the hose 124 in a direction toward the blower 74. This prevents the backward flow of air through the hose when air is pulsed from the pressure chamber 80 through the outlet tube 81. An air filter 128 is used to filter the intake air drawn in by the blower 74.

Figure 2:
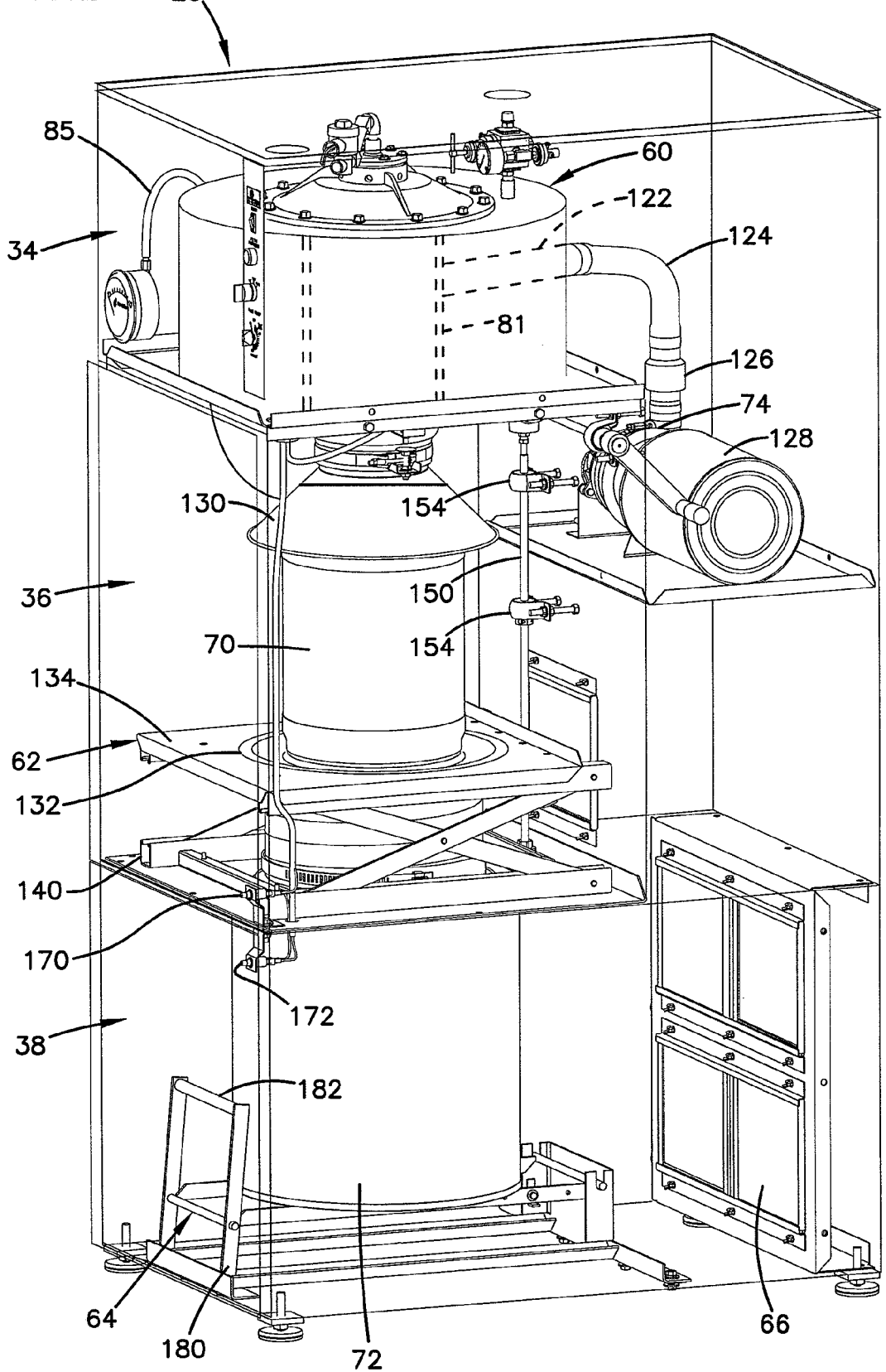
FIG. 2 is a perspective view of the cleaner of FIG. 1 with the walls of the cabinet removed to show the interior components.
Figure 6:
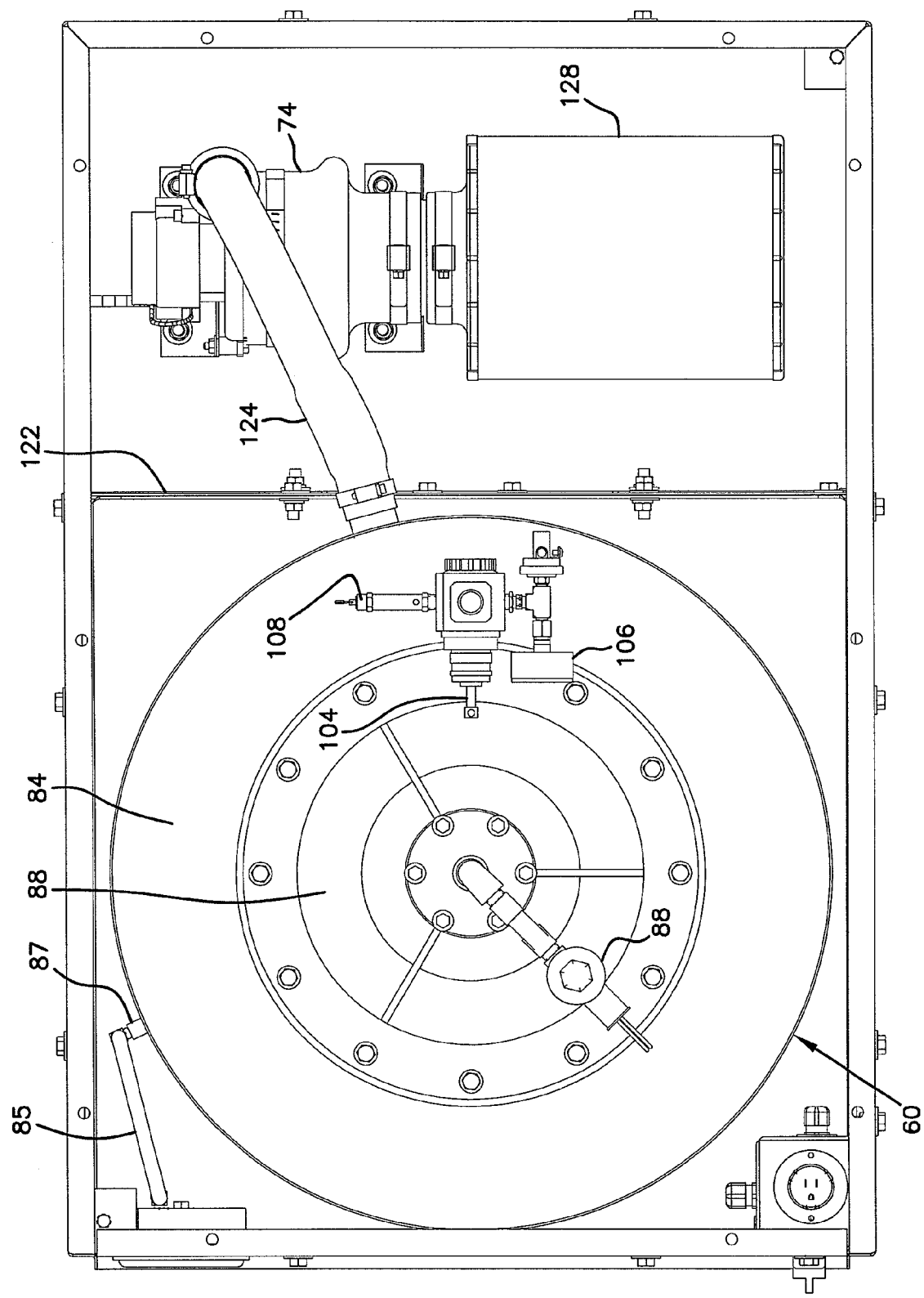
FIG. 6 is a top view of the cleaner of FIG. 1 with the top wall removed.
Figure 7:
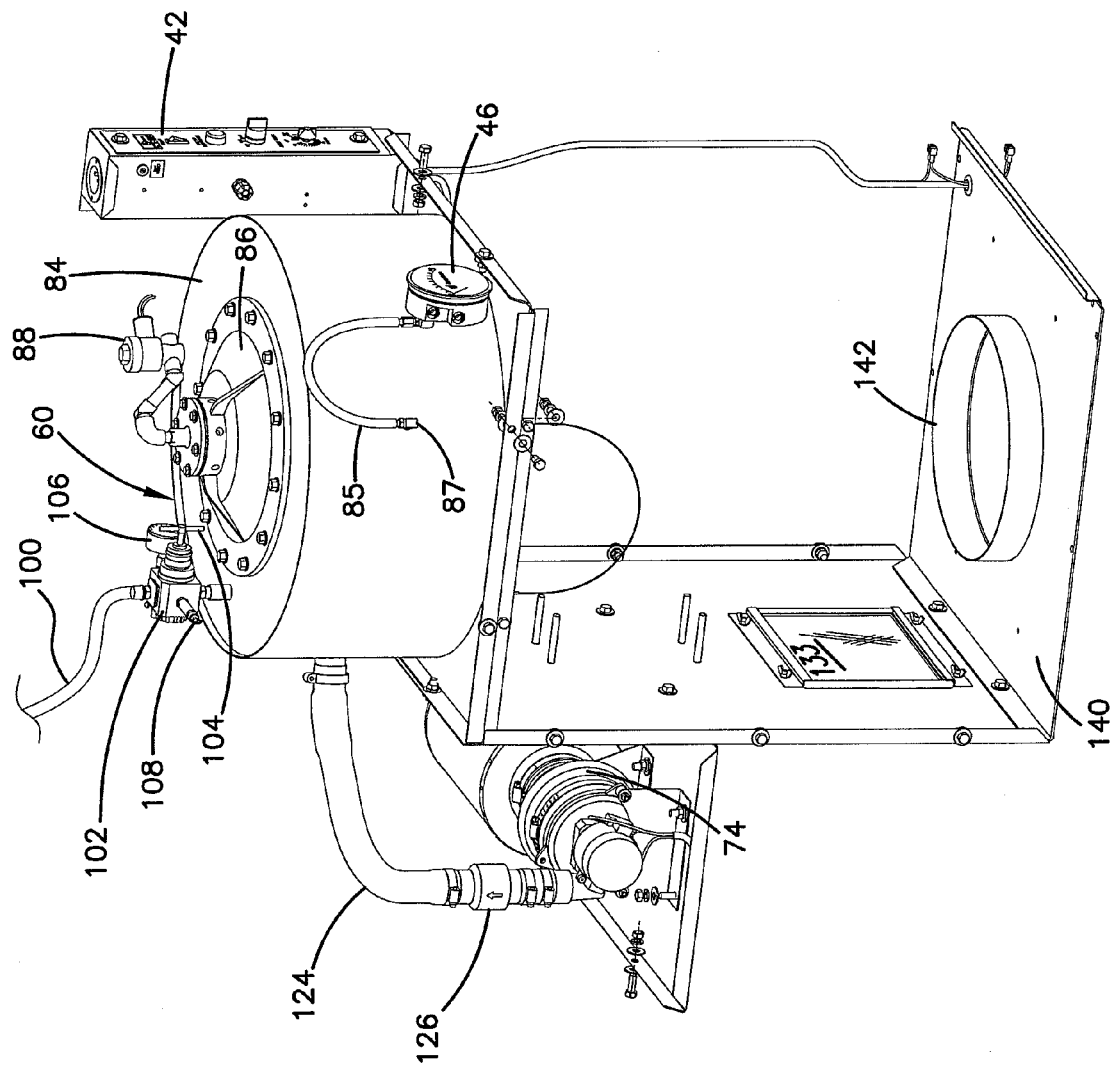
FIG. 7 is a perspective view of a pressure tank and blower assembly of the cleaner of FIG. 1.
Figure 11:
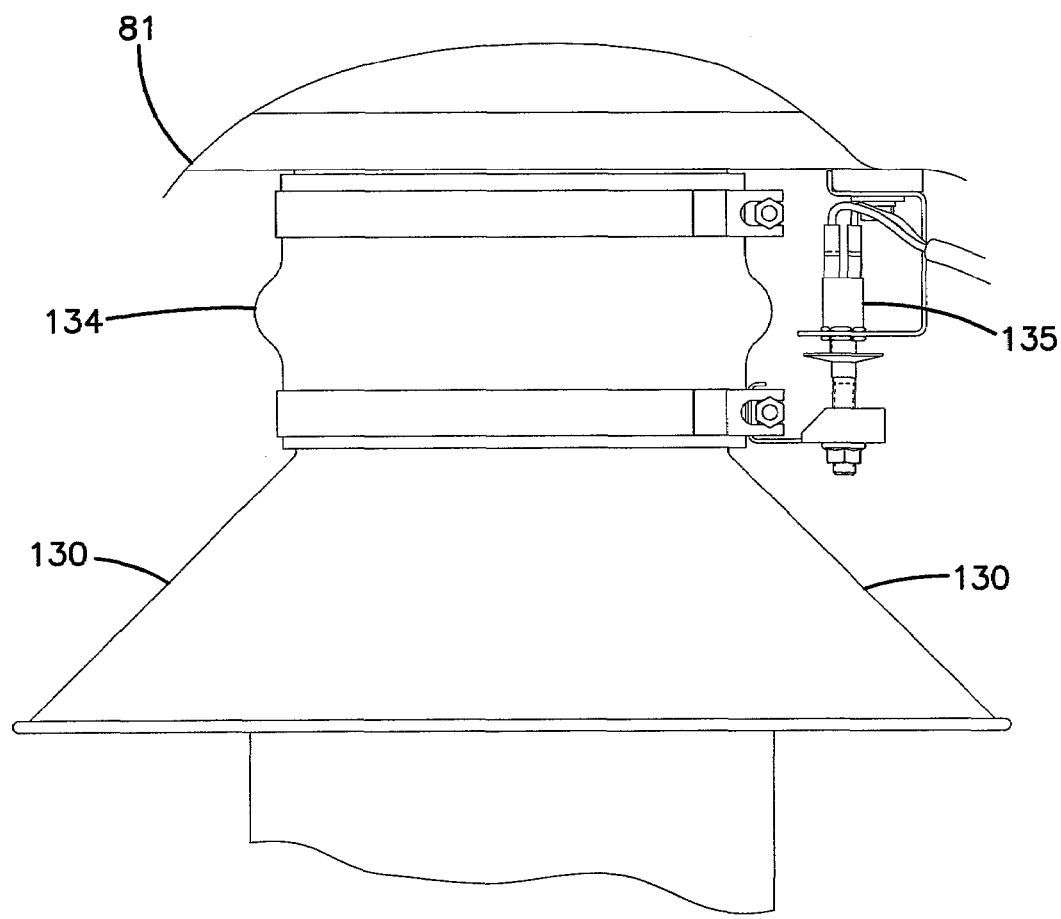
FIG. 11 is a front view of an upper DPF mounting cone of the cleaner of FIG. 1.
Figure 12:
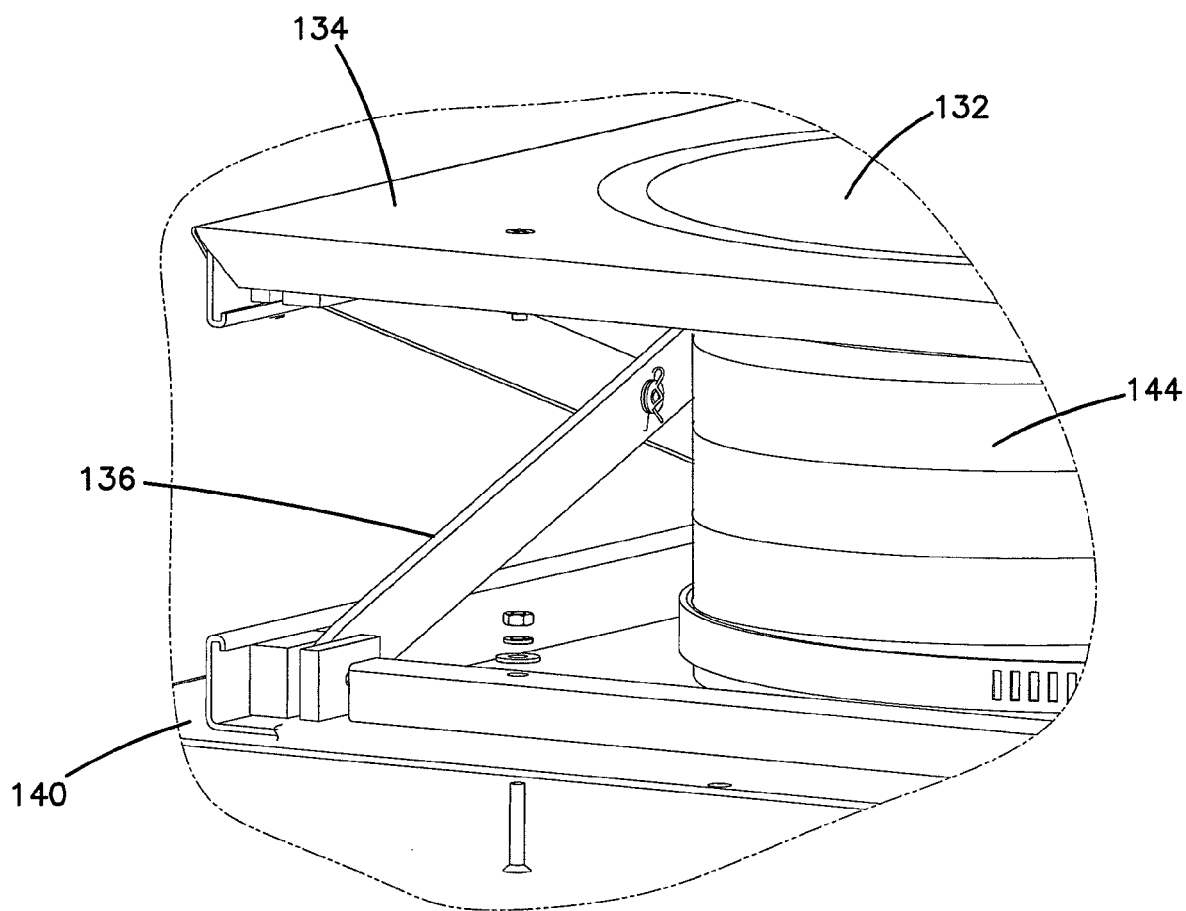
FIG. 12 illustrates a portion of a scissor lift of the cleaner of FIG. 1.

Referring to FIG. 2, the DPF mount 62 of the cleaner 20 includes an upper sealing cone 130 and a lower sealing cone 132. As shown at FIG. 11, the upper sealing cone 130 is connected to the lower end of the pressure chamber outlet pipe 81 by a flexible hose 134. The ends of the hose 134 are held in place with hose clamps. A proximity switch 135 is positioned adjacent the upper sealing cone 130. Referring back to FIG. 2, the lower sealing cone 132 is supported on a platform 134. The platform 134 can be raised and lowered by a scissors lift 136. The scissors lift 136 is supported on a plate 140 positioned directly above the primary filter 72. The plate 140 includes a circular rim 142 (see FIG. 7). As shown at FIG. 12, the lower sealing cone 132 is connected to the rim 142 by a flexible hose 144. The ends of the hose 144 are held in place with hose clamps. Each of the cones 130, 132 preferably includes a resilient inner liner covering the conical interior surfaces of the cones 130, 132. The liners are adapted to provide circumferential seals with the ends of a DPF mounted between the cones 130, 132.

Figure 13:
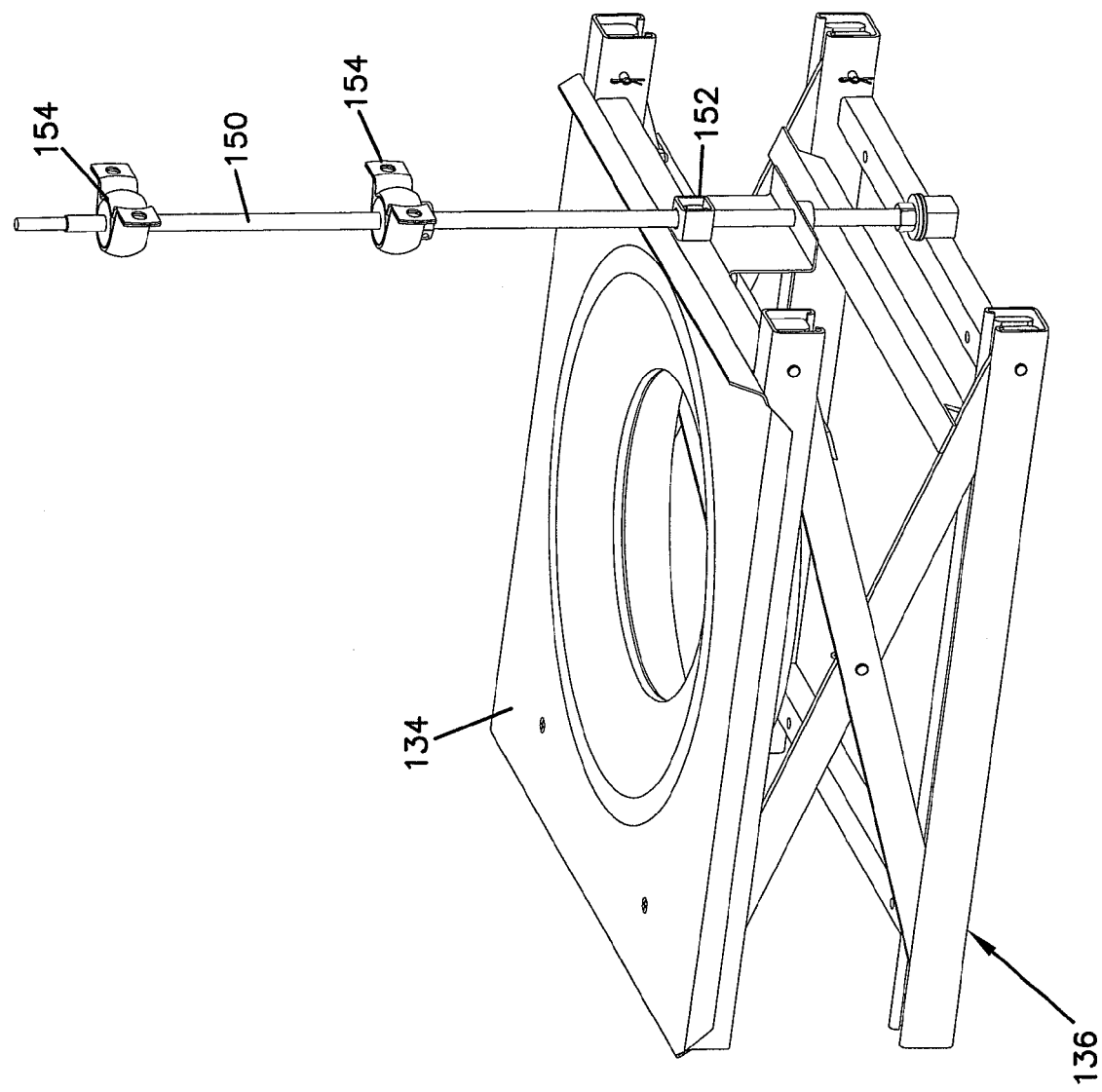
FIG. 13 is a perspective view of a scissor lift of FIG. 12.
Figure 14:
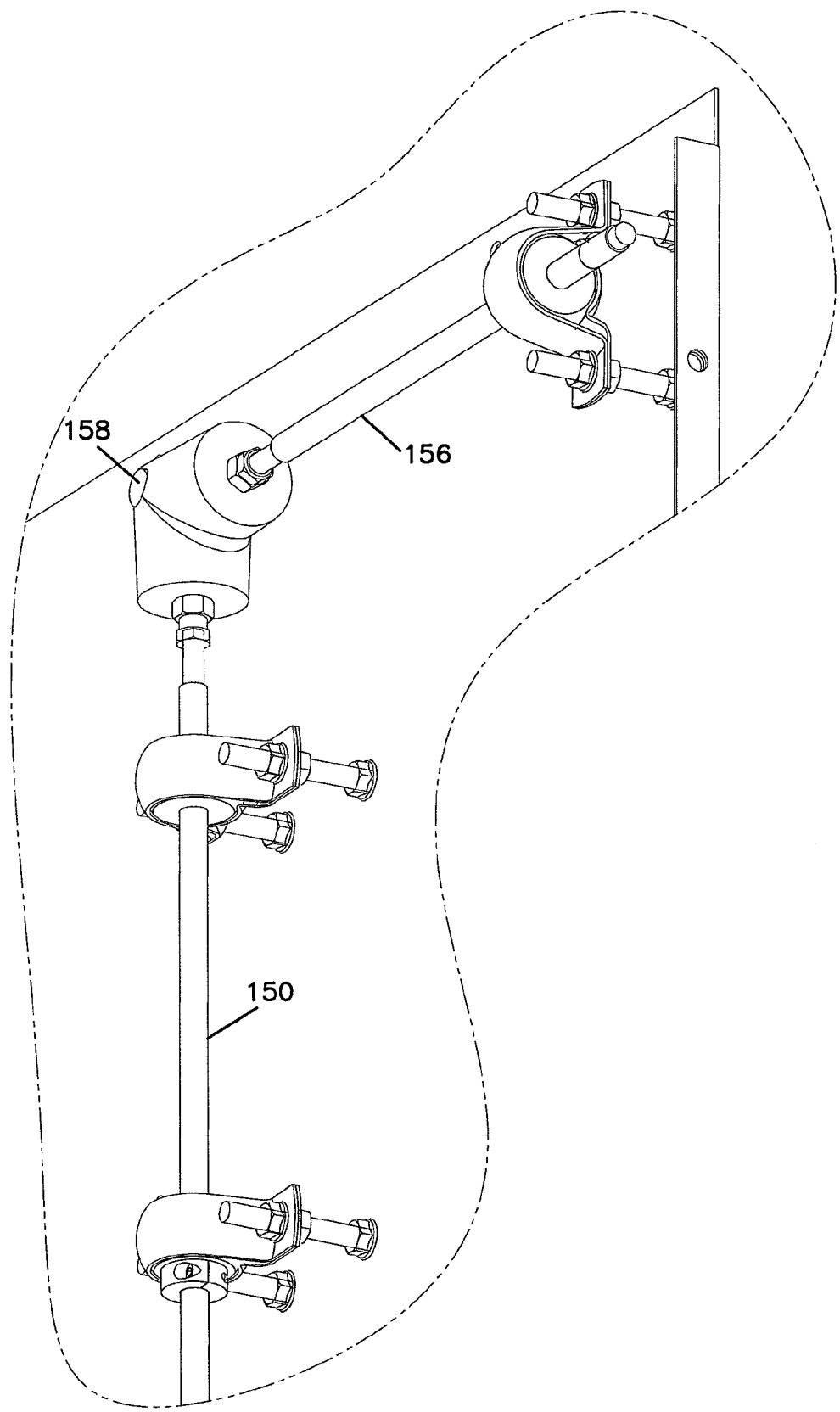
FIG. 14 is a perspective view of a drive linkage for driving the scissor lift of FIG. 13.

The scissors lift 136 includes two pairs of scissors that guide vertical movement of the platform 134. The scissors lift 136 is driven by the manual crank handle 52 provided at the right side of the cabinet 21. A linkage connects the crank handle to the platform 134. The linkage includes a vertical shaft 150 (see FIGS. 2, 13 and 14) that having a threaded portion that threading engages a drive nut 152 secured to the platform 134. Bearings 154 secured to the right wall of the cabinet 21 support the vertical shaft 150. As shown at FIG. 14, the linkage also includes a horizontal shaft 156 coupled to the handle 52, and a right angle drive 158 for transferring torque from the horizontal shaft 156 to the vertical shaft 150. When the vertical shaft 150 is rotated about its axis in a first direction, the nut 152 rides upwardly on the threads to raise the platform 134. When the vertical shaft is rotated in the opposite direction about its axis, the nut rides downwardly on the threads to lower the platform 134.

In use, the cabinet door 46 is opened and the handle 52 is cranked to move the cones 130, 132 apart a sufficient distance to remove a previously cleaned DPF from between the cones. After the previously cleaned DPF has been removed, a DPF in need of service is inserted between the cones 130, 132. The DPF is preferably mounted with the inlet side facing the lower cone 132 and the outlet side facing the upper cone 130. The handle 52 is then cranked to move the lower cone 132 upwardly toward the upper cone 130 until the proximity switch 135 is closed. In this position, the DPF is compressed axially between the two cones 130, 132 such that the cones provide circumferential seals around the inlet and outlet ends of the DPF. The pulse system can then be operated such that pulses of air generated at the pressure chamber 80 are each directed at substantially the entire outlet face of the DPF held between the cones 130, 132. The pulses continue for a timed cleaning duration. Alternatively, the pulses can continue until the backpressure gage 42 provides an indication that DPF has been adequately cleaned. After the pulse cleaning has been terminated, the cleaned DPF can be removed from the cabinet. Thereafter, the steps can be repeated to clean subsequent DPF's.

The proximity switch 135 interfaces with a controller that prevents the cleaner 20 from being operated unless the switch 135 has been closed. Proximity switches 170, 172 are also provided at the doors 46, 48. The switches 170, 172 also interface with a controller that prevents the cleaner 20 from being operated unless the switches 170, 172 have been closed. A further safety feature of the system is a pressure relief panel 133 (see FIG. 7) provided at the wall of the cabinet adjacent the intermediate region. In the event excessive pressure accumulates in the cabinet 21, the panel 133 will open to relieve the pressure. In one embodiment, the panel 133 can be a break away panel such as a frangible panel. Alternatively, the panel 133 can be a swing door that swings open if the pressure within the cabinet exceeds a predetermined amount. A mechanical spring latch or other means (e.g., a magnet) can be used to hold the door closed. A panel filter can also be provided in front of the panel 133 to filter air that leaves the cabinet when the panel 133 opens.

Figure 20:
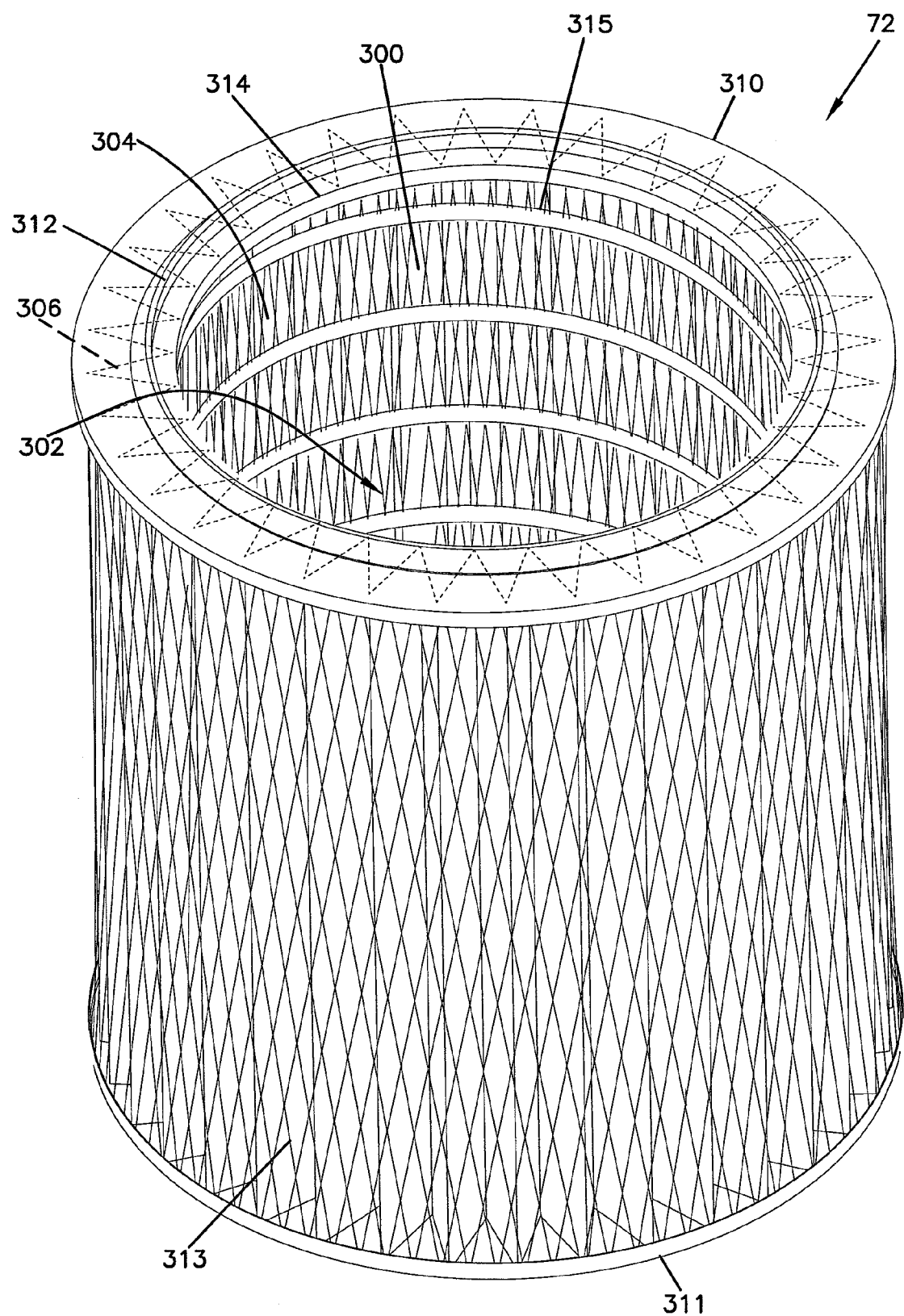
FIG. 20 is a perspective view of an example primary filter for use with the cleaner of FIG. 1.

The primary filter 72 of the cleaner 20 can have any number of different configurations. In one embodiment (see FIG. 20), the filter 72 is cylindrical and includes a central cylindrical liner or core 300 (e.g., a metal or plastic core) defining a central longitudinal opening 302. The core 300 defines a plurality of through-holes 304 and is surrounded by an annular pleated filter media 306. End caps 310, 311 can be provided at the top and bottom ends of the filter 72. The top end cap 310 defines a central opening 314 in fluid communication with the central longitudinal opening 302 of the core 300. A face seal 312 can be provided at the top of the filter surrounding the central opening 314. The filter media 306 is preferably secured to the core 300 to prevent the media from billowing outwardly during a pulse of air. For example the inner pleat tips of the media 306 can be bonded to the core 300. In one embodiment, the inner pleat tips are bonded to the core 303 with an adhesive material such as a hot meld adhesive. For example, a bead 315 of hot melt adhesive can be applied in a helical pattern to the interior of the core. As the hot melt adhesive is applied to the interior of the core 300, the adhesive flows through the through-holes 304 and contacts the inner pleat tips to bond the inner pleat tips to the outside of the core 300. An outer liner 313 can also be provided around the filter media 316.

In use, air that has passed through the DPF enters the primary filter 72 through the central openings 314, 302, and then flows radically outwardly through the pleated filter media 306. As the air flows through the media, soot, ash, oil or other materials in the air are captured on the filter media 306. After passing through the pleated filter media, the air can exit the cabinet 21 through the safety filter 66 at the outlet 54. As shown at FIG. 5, the safety filter 66 can include a module having one or more panel filters (e.g., four panel filters are shown). The primary filter preferably has the capacity to accumulate material from a relatively large number of DPF's before needing replacement.

Figure 15:
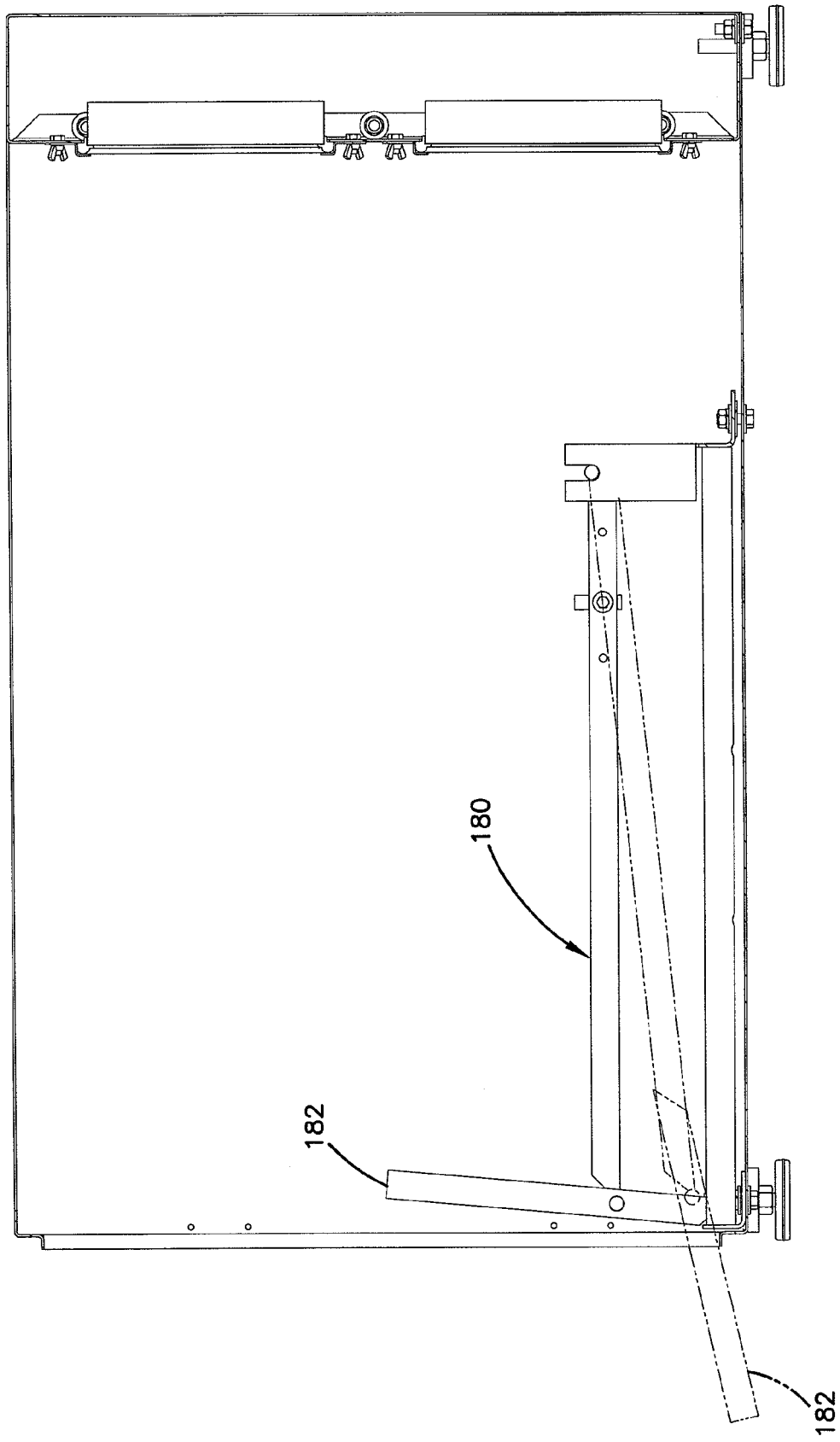
FIG. 15 is a side view of a filter cam lift of the cleaner of FIG. 1.
Figure 16:
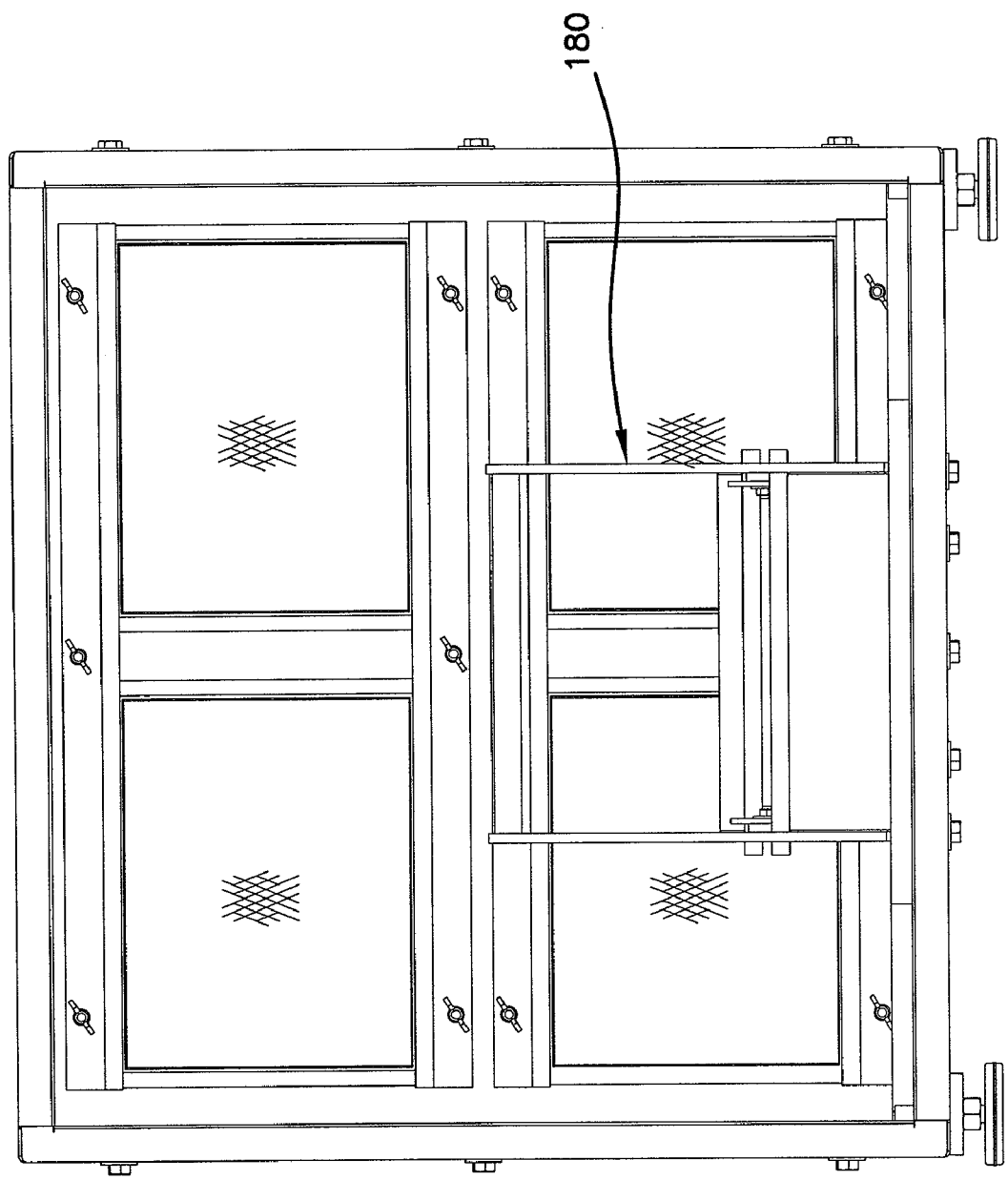
FIG. 16 is a front view of the filter cam lift of FIG. 15.
Figure 17:
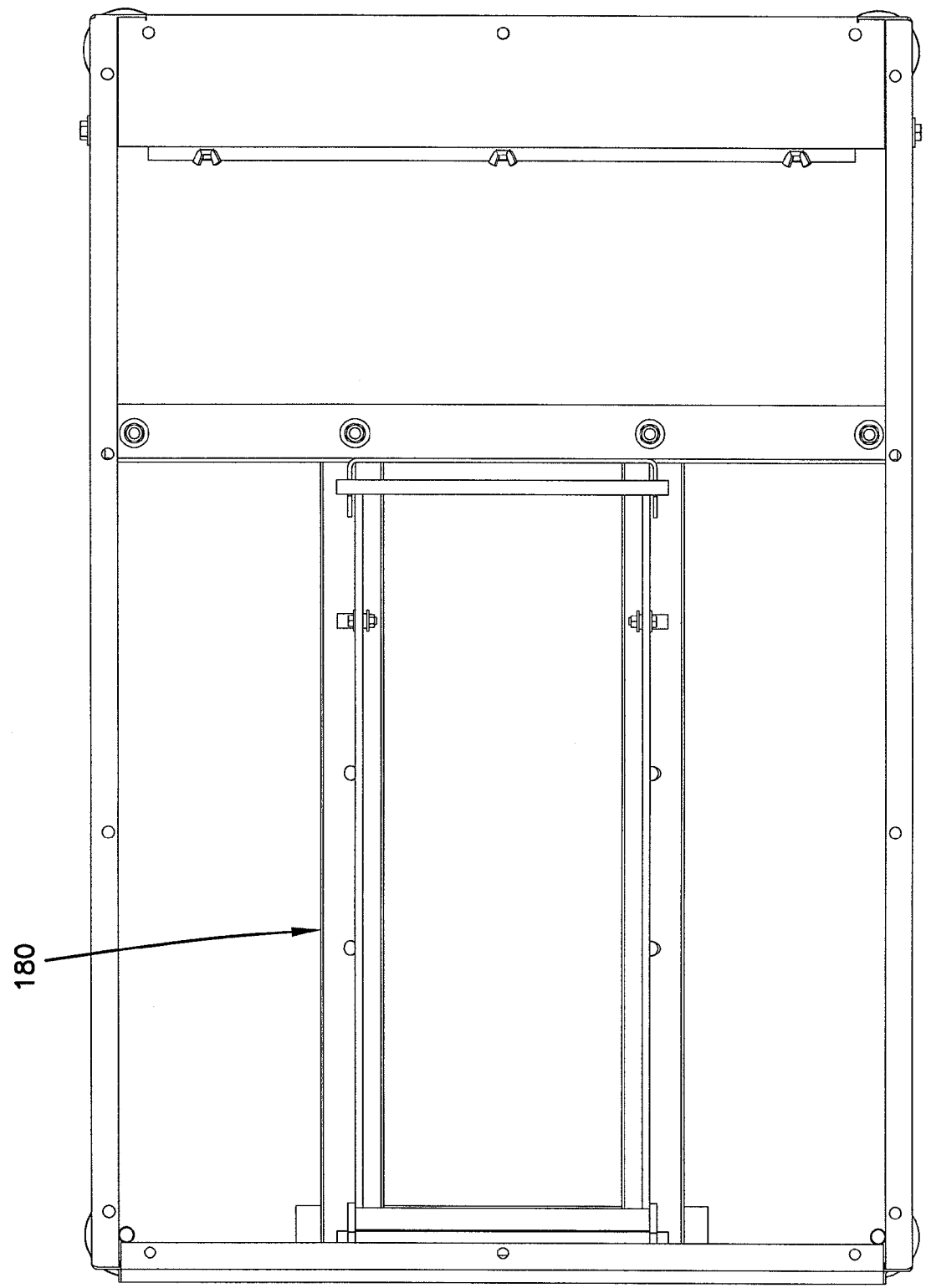
FIG. 17 is a top view of the filter cam lift of FIG. 15.

The primary filter mount 64 of the cleaner 20 is accessed by opening the front door 48. As shown at FIG. 2, the primary filter mount 64 includes a cam lift 180 for lifting the primary filter 72 to compress the face seal of the filter against the underside of the plate 140 to form a seal between the top of the filter 72 and the underside of the plate. When the filter is seated at the mount 64, the central opening of the filter 72 preferably aligns with the hole defined by the rim 142 of the plate 140. To lift the filter 72 into the sealed position, a handle 182 of the cam lift is pivoted upwardly from a lowered position (shown in phantom line at FIG. 15) to a raised position (shown in solid line at FIG. 15).

Figure 18:
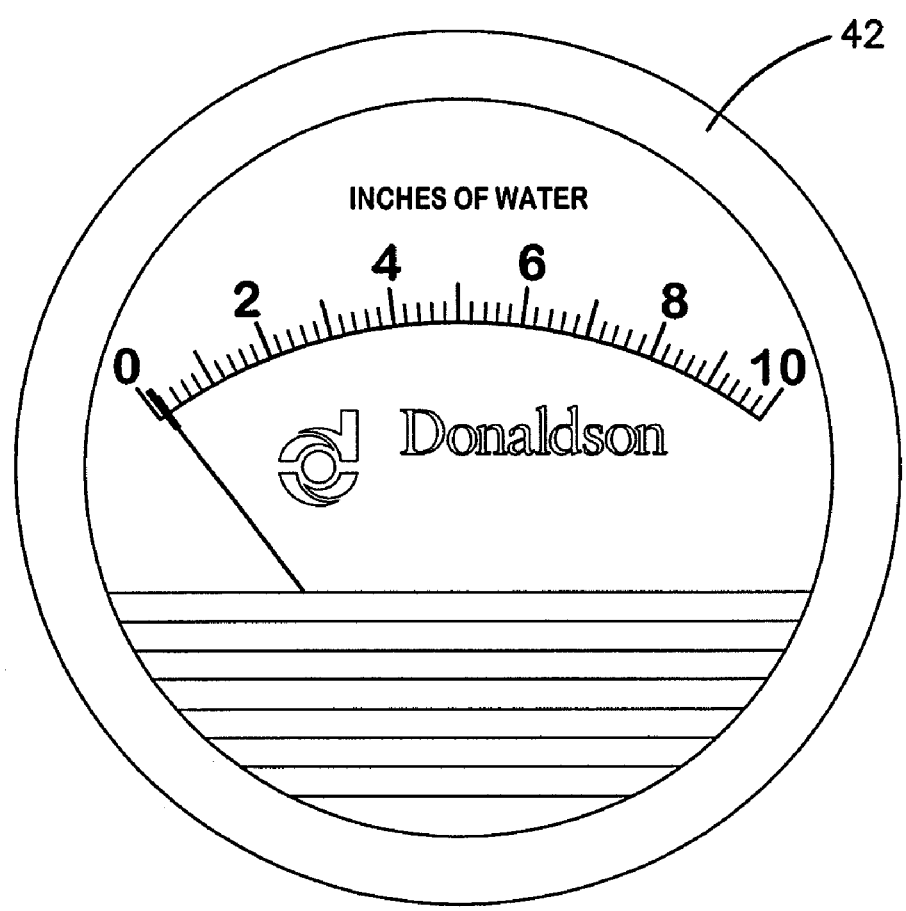
FIG. 18 is a front view of a front pressure gage of the cleaner of FIG. 1.

FIG. 18 is an enlarged view of the pressure gage 42 provided at the front of the cabinet 21. The pressure gage measures the air pressure within the outlet tube 81. In one embodiment, a hose 85 (see FIG. 2) connects the gage 42 to a fitting 87 (see FIG. 7) of a pipe 89 (see FIG. 8) that extends through the pressure chamber 80 to the interior of the outlet pipe 81.

The pressure gage 42 works in combination with the blower 74 to provide an indication as to the cleanliness of the DPF. For example, between pulses, the blower 74 provides a steady flow of air to the upper side of the DPF. The resistance to this air flow by the DPF causes backpressure at the upper side of the DPF. The pressure gage 42 measures this backpressure. The backpressure will drop as the DPF becomes less plugged. Therefore, by monitoring the level of backpressure between pulses, it is possible to assess the cleanliness of the DPF. For example, when the backpressure falls below a predetermined value, or drops a predetermined amount relative to a starting backpressure, the cleaning process can be terminated.

Figure 19:
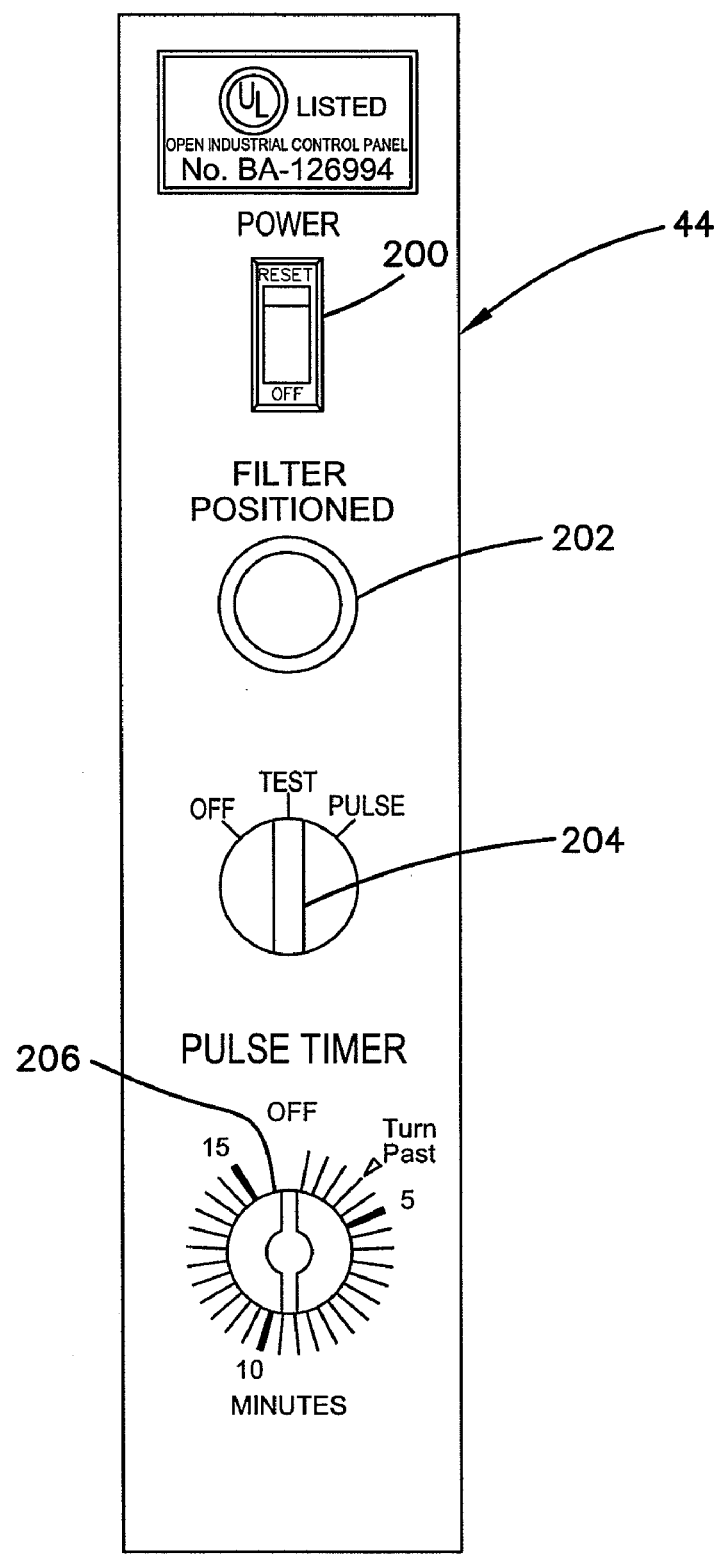
FIG. 19 is a front view of a front control panel of the cleaner of FIG. 1.

FIG. 19 is an enlarged view of the control panel 44 provided at the front of the cabinet 21. The panel 44 interfaces with a controller that coordinates operation of the various electronic components of the system (e.g., the pressure switch 110, the solenoid 88, the blower, the sensors 135, 170, 172, etc.). The panel 44 includes a power switch 200 for turning the cleaner 20 on and off. The panel 44 also includes an LED 202 that illuminates when a DPF has been properly mounted at the DPF mount 62. The panel 44 further includes a switch 204 for activating only the blower ("test") and for activating the blower and the pulse generator together("pulse"). When the switch is set to "test" only the blower 74 is activated giving the operator the opportunity to evaluate the cleanliness of the DPF by evaluating the backpressure reading of the pressure gage 42. When the switch is set to "pulse", the blower is operated and concurrently the pulse generator is activated to clean a DPF within the cabinet 21. The panel further includes a timer 206 for setting the duration of a given cleaning operation. The panel can also be equipped with a pulse counter for counting the number of pulses generated by the pulse generator. The pulse counter can be used to determine the number of pulses used to clean a given DPF or to determine the appropriate time to replace the primary filter. The counter can also be used for warranty purposes.

The above specification provides examples of how certain inventive aspects may be put into practice. It will be appreciated that the inventive aspects can be practiced in other ways than those specifically shown and described herein without departing from the spirit and scope of the inventive aspects.

What is claimed is:

1. A method for cleaning a diesel engine exhaust treatment device comprising:
    removing the diesel exhaust treatment device from a vehicle;
    positioning the diesel exhaust treatment device within an off-vehicle pulse-cleaning cabinet;
    cleaning the diesel exhaust treatment device by directing pulses of air through the diesel exhaust treatment device while the diesel exhaust treatment device is within the cabinet, the pulses of air each being directed at a majority of a face of the diesel exhaust treatment device;
    removing the diesel exhaust treatment device from the off-vehicle pulse-cleaning cabinet after cleaning; and
    remounting the diesel engine exhaust aftertreatment device to the vehicle.

2. The method of claim 1, wherein the diesel exhaust treatment device comprises a diesel particulate filter.

3. The method of claim 2, wherein the diesel particulate filter includes a ceramic substrate having a honey-comb configuration of plugged passages.

4. The method of claim 2, wherein the diesel particulate filter includes silicon carbide or cordierite.

5. The method of claim 2, wherein the diesel particulate filter includes wire mesh.

6. The method of claim 2, wherein the diesel particulate filter includes corrugated metal foil.

7. The method of claim 1, wherein the pulses of air travel in a first direction extending from a first face to a second face of the diesel exhaust treatment device, and wherein air is moved in the first direction through the diesel exhaust treatment device between pulses.

8. The method of claim 7, wherein a blower is used to blow air in the first direction through the diesel exhaust treatment device between pulses.

9. The method of claim 7, wherein the first face is an outlet face and the second face is an inlet face of the diesel exhaust treatment device.

10. The method of claim 1, further comprising capturing material flushed from the diesel exhaust treatment device at a filter positioned within the cabinet downstream of the diesel exhaust treatment device.

11. The method of claim 1, wherein the cleaning process takes 15 minutes or less.

12. The method of claim 1, wherein the cleaning process uses 1-100 pulses.

13. The method of claim 1, wherein the pulses have an approach velocity in the range of 20-100 feet per second.

14. The method of claim 1, wherein the pulses each have a duration in the range of $\frac{1}{50}$ of a second to 1 second.

15. The method of claim 1, further comprising monitoring a back pressure level before and after cleaning the diesel exhaust treatment device.

16. A pulse cleaner for cleaning diesel exhaust treatment devices, after the diesel exhaust treatment devices have been removed from a vehicle, the pulse cleaner comprising:
    an off-vehicle cabinet;
    a diesel exhaust treatment device mount positioned within the cabinet for mounting the diesel exhaust treatment device during pulse cleaning;
    a collection filter positioned within the cabinet for collecting material displaced from the diesel exhaust treatment device during cleaning; and
    a pulse generator for generating pulses that are each directed at a majority of a face of the diesel exhaust treatment device when the diesel exhaust treatment device is mounted at the diesel exhaust treatment device mount, the pulse generator including a pressure tank for accumulating pressurized air, and a valve arrangement that flushes the pressurized air from the tank, wherein a pulse of air for cleaning the diesel exhaust treatment device is generated each time the tank is flushed.

17. The pulse cleaner of claim 16, wherein the pulse generator is positioned at an upper region of the cabinet, the diesel exhaust treatment device mount is positioned at an intermediate region of the cabinet, and the collection filter is positioned at a lower region of the cabinet.

18. The pulse cleaner of claim 16, further comprising a conduit that directs the pulses of air from the pulse generator to the diesel exhaust treatment device mount.

19. The pulse cleaner of claim 16, wherein the diesel exhaust treatment device mount includes first and second sealing cones between which the diesel exhaust treatment device is mounted, and wherein the pulse cleaner includes a first conduit that provides fluid communication between the first cone and the pulse generator, and a second conduit that provides fluid communication between the second cone and the collection filter.

20. The pulse cleaner of claim 16, wherein the pressure tank has a volume in the range of 5-50 gallons, and the pressure tank is pressurized to an air pressure less than 15 pounds per square inch at the time the pressure tank is flushed.

21. The pulse cleaner of claim 16, wherein the pulses travel through the diesel exhaust treatment device in a direction toward the collection filter, and wherein the pulse cleaner further comprises a blower for forcing air through the diesel exhaust treatment device in a direction toward the primary filter between pulses.

22. The pulse cleaner of claim 21, further comprising a pressure gage for measuring the back pressure generated behind the diesel exhaust treatment device.

23. The pulse cleaner of claim 22, further comprising a switch for deactivating the pulse generator while the blower continues to force air through the diesel exhaust treatment device.

24. The pulse cleaner of claim 18, wherein ends of the conduit are sealed to prevent air from the pulses from by-passing the diesel exhaust treatment device.

25. The pulse cleaner of claim 24, wherein the ends of the conduit are sealed with clamps.

26. The pulse cleaner of claim 21, further comprising a check-valve for preventing air from being forced backwardly through the blower during a pulse of air.

27. A pulse cleaner for cleaning diesel exhaust treatment devices after the diesel exhaust treatment devices have been removed from a vehicle, the pulse cleaner comprising:
    an off-vehicle pulse-cleaning cabinet;
    a diesel exhaust treatment device mount positioned within the cabinet for mounting the diesel exhaust treatment device during pulse cleaning;
    a primary filter positioned within the cabinet for collecting material displaced from the diesel exhaust treatment device during cleaning; and
    a pulse generator for generating pulses that are each directed at a majority of a face of the diesel exhaust treatment device when the diesel exhaust treatment device is mounted at the diesel exhaust treatment device mount, the pulse generator including a pressure tank for accumulating pressurized air, and a valve arrangement that flushes the pressurized air from the tank, wherein a pulse of air for cleaning the diesel exhaust treatment device is generated each time the tank is flushed, the pulse generator also including a conduit for carrying pulses from the pulse generator to the diesel exhaust treatment device, the conduit being sealed with respect to the diesel exhaust treatment device to prevent air from pulses from by-passing the diesel exhaust treatment device.

28. A pulse cleaner for cleaning diesel exhaust treatment devices, the pulse cleaner comprising:
    a cabinet;
    a diesel exhaust treatment device mount positioned within the cabinet for mounting the diesel exhaust treatment device during pulse cleaning;
    a primary filter positioned within the cabinet for collecting material displaced from the diesel exhaust treatment device during cleaning; and
    a pulse generator for generating air pulses for cleaning the diesel exhaust treatment device when the diesel exhaust treatment device is mounted at the diesel exhaust treatment device mount, the pulse generator configured to direct air pulses through a conduit toward the diesel exhaust treatment device, the conduit including a cone that is positioned above the diesel exhaust treatment device for directing air pulses toward a face of the diesel exhaust treatment device when the diesel exhaust treatment device is mounted at the diesel exhaust treatment device mount.

29. The pulse cleaner of claim 16, further comprising a conduit that directs the pulses of air from the pulse generator toward the diesel exhaust treatment device mount, the conduit including a cone that is configured to be positioned above the diesel exhaust treatment device for directing pulses of air toward a face of the diesel exhaust treatment device when the diesel exhaust treatment device is mounted at the diesel exhaust treatment device mount.

30. A method for cleaning a diesel engine exhaust treatment device comprising:
    positioning the diesel exhaust treatment device within a pulse-cleaning cabinet;
    cleaning the diesel exhaust treatment device by directing pulses of air through the diesel exhaust treatment device while the diesel exhaust treatment device is within the cabinet, the pulses of air each being directed at a majority of a face of the diesel exhaust treatment device, wherein the pulses of air travel in a first direction extending from a first face to a second face of the diesel exhaust treatment device, wherein air is moved in the first direction through the diesel exhaust treatment device between pulses, and wherein a blower is used to blow air in the first direction through the diesel exhaust treatment device between pulses; and
    removing the diesel exhaust treatment device from the pulse-cleaning cabinet after cleaning.

31. A pulse cleaner for cleaning diesel exhaust treatment devices, the pulse cleaner comprising:
    a cabinet;
    a diesel exhaust treatment device mount positioned within the cabinet for mounting the diesel exhaust treatment device during pulse cleaning;
    a collection filter positioned within the cabinet for collecting material displaced from the diesel exhaust treatment device during cleaning; and
    a pulse generator for generating pulses that are each directed at a majority of a face of the diesel exhaust treatment device when the diesel exhaust treatment device is mounted at the diesel exhaust treatment device mount, the pulse generator including a pressure tank for accumulating pressurized air, and a valve arrangement that flushes the pressurized air from the tank, wherein a pulse of air for cleaning the diesel exhaust treatment device is generated each time the tank is flushed;
    wherein the diesel exhaust treatment device mount includes first and second sealing cones between which the diesel exhaust treatment device is mounted, and wherein the pulse cleaner includes a first conduit that provides fluid communication between the first cone and the pulse generator, and a second conduit that provides fluid communication between the second cone and the collection filter.

32. A pulse cleaner for cleaning diesel exhaust treatment devices, the pulse cleaner commprising:
    a cabinet;
    a diesel exhaust treatment device mount positioned within the cabinet for mounting the diesel exhaust treatment device during pulse cleaning;
    a collection filter positioned within the cabinet for collecting material displaced from the diesel exhaust treatment device during cleaning; and
    a pulse generator for generating pulses that are each directed at a majority of a face of the diesel exhaust treatment device when the diesel exhaust treatment device is mounted at the diesel exhaust treatment device mount, the pulse generator including a pressure tank for accumulating pressurized air, and a valve arrangement that flushes the pressurized air from the tank, wherein a pulse of air for cleaning the diesel exhaust treatment device is generated each time the tank is flushed;

wherein the pulses travel through the diesel exhaust treatment device in a direction toward the collection filter, and wherein the pulse cleaner further comprises a blower for forcing air through the diesel exhaust treatment device in a direction toward the primary filter between pulses.

33. The pulse cleaner of claim 32, further comprising a pressure gage for measuring the back pressure generated behind the diesel exhaust treatment device.

34. The pulse cleaner of claim 33, further comprising a switch for deactivating the pulse generator while the blower continues to force air through the diesel exhaust treatment device.

35. The pulse cleaner of claim 32, further comprising a check-valve for preventing air from being forced backwardly through the blower during a pulse of air.

36. A pulse cleaner for cleaning diesel exhaust treatment devices, the pulse cleaner comprising:
- a cabinet;
- a diesel exhaust treatment device mount positioned within the cabinet for mounting the diesel exhaust treatment device during pulse cleaning;
- collection filter positioned within the cabinet for collecting material displaced from the diesel exhaust treatment device during cleaning;
- a pulse generator for generating pulses that are each directed at a majority of a face of the diesel exhaust treatment device when the diesel exhaust treatment device is mounted at the diesel exhaust treatment device mount, the pulse generator including a pressure tank for accumulating pressurized air, and a valve arrangement that flushes the pressurized air from the tank, wherein a pulse of air for cleaning the diesel exhaust treatment device is generated each time the tank is flushed; and
- a conduit that directs the pulses of air from the pulse generator toward the diesel exhaust treatment device mount, the conduit including a cone that is configured to be positioned above the diesel exhaust treatment device for directing pulses of air toward a face of the diesel exhaust treatment device when the diesel exhaust treatment device is mounted at the diesel exhaust treatment device mount.

* * * * *

UNITED STATES PATENT AND TRADEMARK OFFICE
CERTIFICATE OF CORRECTION

PATENT NO. : 7,410,530 B2
APPLICATION NO. : 11/335163
DATED : August 12, 2008
INVENTOR(S) : Wagner et al.

It is certified that error appears in the above-identified patent and that said Letters Patent is hereby corrected as shown below:

Col. 2, line 2: "cleaned inset" should read --cleaned insitu--

Col. 3, line 51: "metal or zealots." should read --metals or zeolites.--

Col. 7, line 26: "that threading engages" should read --that threadingly engages--

Col. 8, line 36: "flows radically outwardly" should read --flows radially outwardly--

Signed and Sealed this

Twentieth Day of January, 2009

JON W. DUDAS
*Director of the United States Patent and Trademark Office*